US008155975B1

(12) United States Patent
Heit

(10) Patent No.: US 8,155,975 B1
(45) Date of Patent: Apr. 10, 2012

(54) SYSTEM AND METHOD FOR PROVIDING CONFIGURATION AND SETTLEMENT PROCESSING OF FINANCIAL TRANSACTIONS USING A HIERARCHY NODE MODEL

(75) Inventor: Graham Heit, Waterloo (CA)

(73) Assignee: RDM Corporation, Waterloo (CA)

( * ) Notice: Subject to any disclaimer, the term of this patent is extended or adjusted under 35 U.S.C. 154(b) by 910 days.

(21) Appl. No.: 11/267,207

(22) Filed: Nov. 7, 2005

Related U.S. Application Data

(60) Provisional application No. 60/625,091, filed on Nov. 5, 2004.

(51) Int. Cl.
*G06Q 10/00* (2012.01)
*G06Q 40/00* (2012.01)
(52) U.S. Cl. .......................................... 705/1.1; 705/39
(58) Field of Classification Search ................ 705/1, 21, 705/45, 1.1, 39; 358/1.15
See application file for complete search history.

(56) References Cited

U.S. PATENT DOCUMENTS

| 5,930,778 | A  | * | 7/1999 | Geer ................................ 705/45 |
| 7,577,611 | B2 | * | 8/2009 | Heit et al. ........................ 705/42 |
| 2003/0200107 | A1 | * | 10/2003 | Allen et al. ........................ 705/1 |
| 2004/0070566 | A1 | * | 4/2004 | Ashton ........................... 345/156 |
| 2005/0087595 | A1 | * | 4/2005 | Phillips et al. ................ 235/379 |
| 2006/0106717 | A1 | * | 5/2006 | Randle et al. .................... 705/45 |

* cited by examiner

*Primary Examiner* — Benny Tieu
*Assistant Examiner* — Eric A Rust
(74) *Attorney, Agent, or Firm* — Grant Tisdall; Gowling Lafleur Henderson LLP

(57) ABSTRACT

Client systems use a scanner to convert a paper form of a document to a digital representation and then send the digital representation over a network to a host system for storage. The host system archives the digital representation and determines the appropriate processing stream for a transaction related to the paper document, via a decisioning engine, based on a set of predefined stream selection rules. The host system then communicates the transaction to a back end transaction destination, according to the selected processing stream, using a hierarchy for coordinating the configuration of the host and client systems as well as coordinating the settlement process for the digital representations.

24 Claims, 31 Drawing Sheets

FIG. 1iii

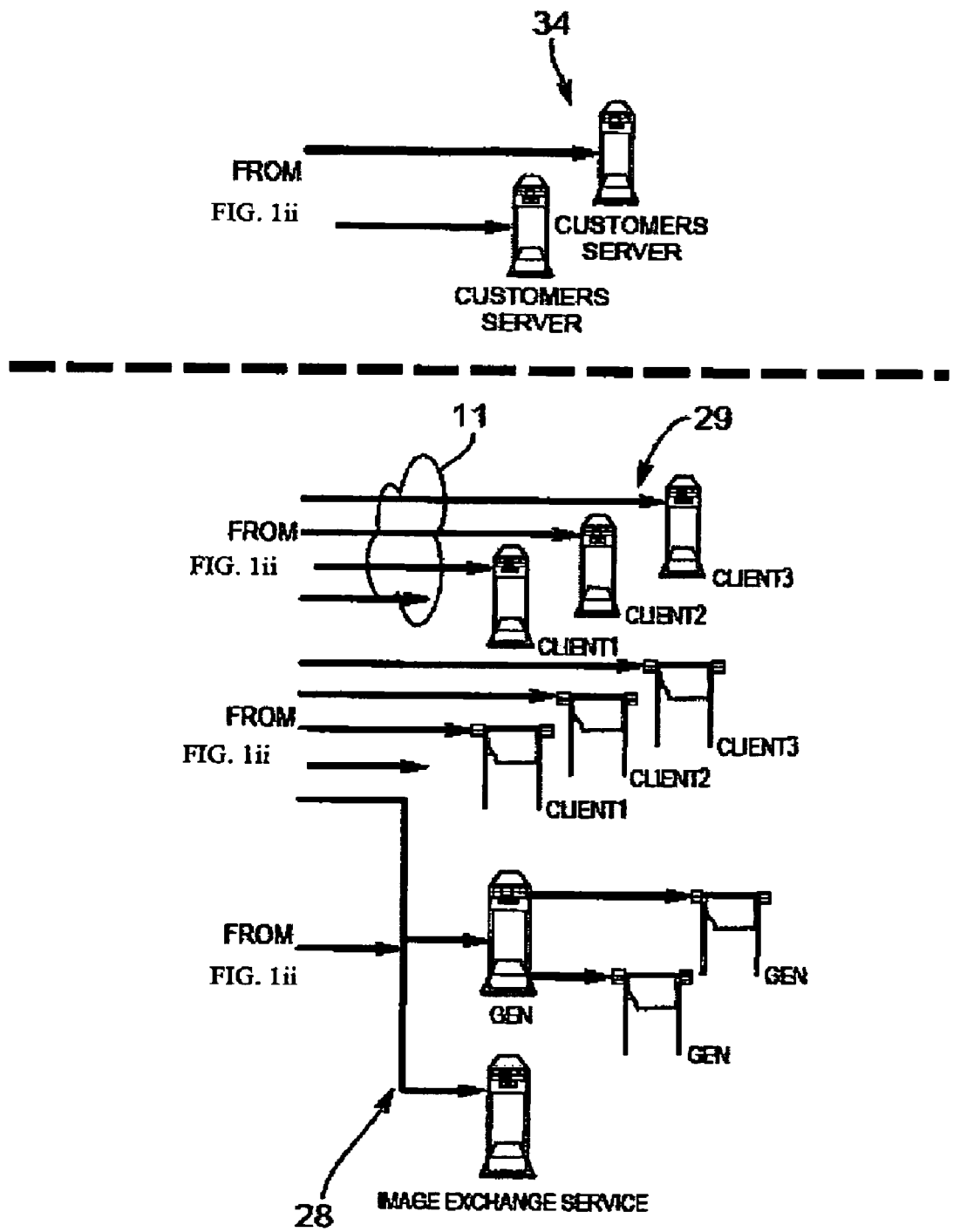
FIG. 1iii

| Settlement paths/endpoints 28 | Terminology | Explanation |
|---|---|---|
| Stop | Stop | Item cannot be processed by ITMS or by the bank. Note:environment 501 to be configured for ITMS Client side "Stop" processing. |
| Paper Deposit | Original Paper Deposit (OPD) | Original paper check must be deposited at the bank. |
| IRD | Reproduced Paper (RP) | Item will be processed as an IRD (Image Replacement Document). |
| ACH | Automated Clearing House | Item can be processed through ACH member 29 network |

Figure 12a

| ITMS DDP Filter Types | Description / Function |
|---|---|
| Stops | Biller Stops: Can be configured to reject a particular checking account number or bank R/T number from being accepted by the ITMS system. |
| Rules | ACH Eligibility Rules: Can be configured to enforce current NACHA regulations on the attributes of transactions that can be processed through ACH system. Eligibility rules can be configured based on check dollar amounts, check type (i.e. corporate checks) and/or check number(s) for items that are not to be processed as ACH transactions. |
| Opt-Outs | Consumer Opt-Outs: Can be configured to identify a consumer account that has chosen not to have their check processed as an ACH transaction. Consumer accounts can be identified either by the Biller account number (secondary ID) or the bank R/T number and checking account number for the consumer. |
| Blocks | MICR Account Blocks: Can be configured to block particular checking account numbers or bank R/T numbers from being processed as ACH transactions. |
| ACHables | Bank ACHables: Can be configured to accept items from specific bank R/T numbers that are eligible for ACH processing. |

822     Figure 12b     824

| ITMS DDP Decisioning Filters | ITMS DDP Configurable Endpoint(s) | Explanation |
|---|---|---|
| Stops | Stop | Typically configured for ITMS Client side decisioning, the user will be prompted with a message stating that the check has been stopped for processing. Neither ITMS nor the bank can process stopped items. |
| Rules | OPD | If configured for Client side decisioning, the user will be prompted to deposit the check at the bank (OPD).<br><br>If configured for Host side decisioning, the user will not be prompted and the Host will route the item for IRD processing (RP). |
| Rules | RP | |
| Opt-Outs | OPD | |
| Opt-Outs | RP | |
| Blocks | OPD | |
| Blocks | RP | |
| ACHables | OPD | |
| ACHables | RP | |

Figure 12c

| DDP Configuration 827 | DDP Decisioning Type 822 | Enabled (Y/N) 814 | Processing Location (Client / Host) 832 | Expected Endpoint (Paper Deposit, IRD, Stop, ACH) 28 | Typical User Message 828 |
|---|---|---|---|---|---|
| ACH Eligible / Paper Deposit Ineligible (Flowchart A) | Biller "Stops" | Y | Client | Stop | This check cannot be accepted. Please return to the Consumer. |
| | ACH Eligibility "Rules" | Y | Client | Original Paper Deposit (OPD) | Please deposit this check through normal channels at your Bank. |
| | Consumer "Opt-Outs" | Y | Client | Original Paper Deposit (OPD) | Please deposit this check through normal channels at your Bank. |
| | MICR "Blocks" | Y | Client | Original Paper Deposit (OPD) | Please deposit this check through normal channels at your Bank. |
| | Bank "ACHables" | Y | Client | Original Paper Deposit (OPD) | Please deposit this check through normal channels at your Bank. |
| ACH Eligible / IRD Ineligible (Flowchart B) | Biller "Stops" | Y | Client | Stop | This check cannot be accepted. Please return to the Consumer. |
| | ACH Eligibility "Rules" | Y | Host | IRD (RP) | N/A |
| | Consumer "Opt-Outs" | Y | Host | IRD (RP) | N/A |
| | MICR "Blocks" | Y | Host | IRD (RP) | N/A |
| | Bank "ACHables" | Y | Host | IRD (RP) | N/A |
| IRD All (Flowchart C) | Biller "Stops" | Y | Client | Stop | This check cannot be accepted. Please return to the Consumer. |
| | ACH Eligibility "Rules" | Y | Host | IRD (RP) | N/A |
| | Consumer "Opt-Outs" | N | N/A | N/A | N/A |
| | MICR "Blocks" | N | N/A | N/A | N/A |
| | Bank "ACHables" | N | N/A | N/A | N/A |

Figure 12d

SYSTEM AND METHOD FOR PROVIDING
CONFIGURATION AND SETTLEMENT
PROCESSING OF FINANCIAL
TRANSACTIONS USING A HIERARCHY
NODE MODEL

This application claims the benefit of U.S. Provisional Application No. 60/625,091, filed Nov. 5, 2004, in its entirety herein incorporated by reference.

BACKGROUND

The current paper document processing environment is heavily dependent upon paper processing, which can be inefficient. What is needed is an electronic paper document capture, storage, and process system to alleviate or otherwise mitigate the dependence upon paper form of items such as personal and business checks, for example.

In current systems for electronic processing of checks, for example that described in U.S. Pat. No. 6,032,137, because items will be uploaded from many sources, there is an opportunity for upload volume peaks and valleys. And, since merchants are provided with a specific cut-off time after which, if they have not uploaded items by then, the merchants can potentially lose one day's float, it is expected that a significant upload volume peak will occur during the hour (or even minutes) prior to the cut-off time. This volume problem needs to be addressed given that this spiky arrival pattern, and given the fact that the system will inherently have an upper limit on the intake (or capture) throughput it can sustain. In addition, different uploads will belong to different banks (e.g. customers of the system) but the items associated with each of the different banks will be co-mingled during the upload stages. It is desirable to prepare and forward for settlement a settlement file (associated with the uploaded items) as soon as possible after the specified cut-off time, and different banks will have different cut-off times.

A further problem in current systems is inherent in centralised processing of the items, where all decisioning of the items to result in selected settlement paths is carried out at a host system, thus providing for potential bottlenecks in item processing during peak volume periods, for example.

A further problem is in efficient management of the system when it includes a plurality of client systems (for uploading the items) and one of more respective host systems (for processing the items to assign a respective settlement path) in the environment of multiple customers of the system, all with their own settlement and item processing needs.

BRIEF DESCRIPTION OF THE DRAWINGS

These and other features will become more apparent in the following detailed description in which reference is made to the appended drawings by way of example only, wherein:

FIG. 1*ii* is a further portion of FIG. 1;
FIG. 1*iii* is further portion of FIG. 1.

DESCRIPTION

Network System

The following description includes at least one embodiment of a method for coordinating the generation of a plurality of transactions from settlement data associated with decisioned transaction data originally captured by at least one client system, the captured transaction data based on original paper transactions and including at least digital images of the respective original paper transactions, the method comprising the steps of: assigning respective portions of the settlement data to a first node and a second node; providing a hierarchical relationship between the first node in a first hierarchy level and the second node in a second hierarchy level, the first node related to the second node as a dependent node; and initiating a settlement process at the second node for collecting all settlement data assigned to the second node; continuing the settlement process at the first node as defined by the hierarchical relationship for collecting all settlement data assigned to the first node; and generating the plurality of transactions based on the collected settlement data for sending to at least one member system responsible for electronically processing the plurality of transactions.

The following description includes at least one embodiment of a system for coordinating the generation of a plurality of transactions from settlement data associated with decisioned transaction data originally captured by at least one client system, the captured transaction data based on original paper transactions and including at least digital images of the respective original paper transactions, the system comprising: at least one storage for assigning respective portions of the settlement data to a first node and a second node; a hierarchy for providing a hierarchical relationship between the first node in a first hierarchy level and the second node in a second hierarchy level, the first node related to the second node as a dependent node; and a settlement module for initiating a settlement process at the second node for collecting all settlement data assigned to the second node, for continuing the settlement process at the first node as defined by the hierarchical relationship for collecting all settlement data assigned to the first node; and for configuring the collected settlement data for use in generating the plurality of transactions for sending to at least one member system responsible for electronically processing the plurality of transactions.

Figure 1I:
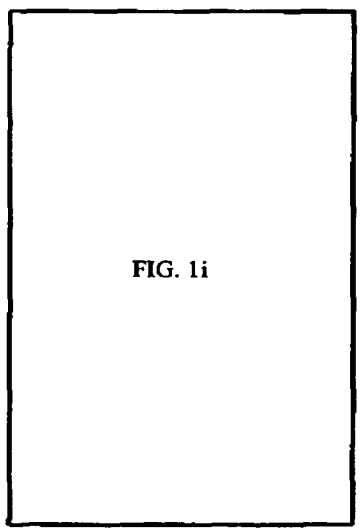
FIG. 1*i* is a portion of FIG. 1.
Figure 1I:
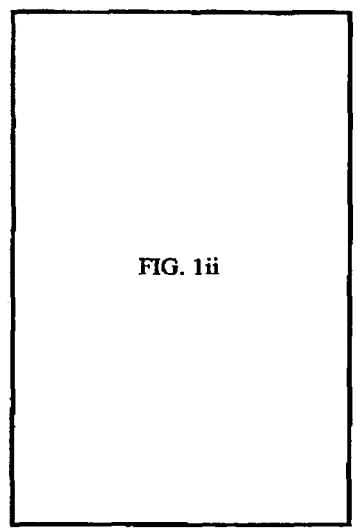

Referring to FIG. 1a, network system 10 for providing a plurality of distributed client systems 12 for communicating with a host system 14 over a network 11 (e.g. Internet or other extranet/intranet), such as but not limited to using an ASP model implementation. It is recognised that the network 11 can generally refer to one network or series of networks connecting the various network entities of the network system 10 to each other for communication purposes and image/data 20 and transaction 26 transfer. The network system 10 provides for electronic payment processing for electronic check conversion systems including web-based image and transaction management services for banks, billers, retailers, payment processors and/or government agencies, hereafter generically referred to as members 29. The client system 12 can use a scanner 16 to convert a paper form of a check, coupon, or other paper document 18 to a digital representation image and associated data, hereafter referred to as image/data 20 files/packages/packets (or image/data 20 for short), and then the client system 12 sends/uploads the digital image/data 20 over the network 11 to the host system 14 for registration/storage in a database 22. It is also recognised that the image/data 20 source (e.g. client system 12) can be from a telephone order (TEL), such that the bank account and monetary amount is entered manually over the phone between the account holder and the telephone operator submitting the financial transaction. In this case of manual entry of the financial information, including the "check" information, the network system 10 is configured for processing this financial information by the host system 14, including reproduce paper as further described below. In this sense, the telephone order will also be considered to have an "image" component that is reproducible as a paper draft upon request from the host system 14 when stored in the database 22.

The format of the image/data 20 transmission protocols/ formats and acknowledgement formats (e.g. XML or other structured definition language defined protocols/formats), used in the network system 10, is defined for the network communication between the host system 14 and client system 12. It is recognised that the client system 12 can represent image/data 20 captured by a user of the client system 12 (e.g. mainly through the use of the scanner 16) or the client system 12 can be represented by a customer server 30, which processes a large volume of transactions gathered electronically (mainly) from a plurality of user-operated client systems 12. For example, the customer server 30 can be a central deposit depot for all electronically captured image/data 20 submitted from a number of user-operated client systems 12 (e.g. used by field agents). For simplicity purposes only, user-operated client systems 12 and customer servers 30 are hereafter referred to as client systems 12.

It is recognised that the image/data 20 can include data such as but not limited to: bank account (check writer's); RTN (bank number); check 18 serial number; amount; date of capture; capture site info (merchant ID); optional fields'; transaction type (ARC vs. POP); image reference/item number; and batch ID.

The host system 14 archives the image/data 20 and determines the appropriate processing stream 28 for a transaction file 26 related to the paper document (e.g. coupon, check) represented by the image/data 20, via a decisioning engine 24, based on a set of predefined stream selection rules. The engine 24 decides the types of transactions 26 to accept based on decisioning criteria, as well as decides which settlement 110 path (i.e. transaction stream 28) to select, see FIG. 4. The host system 14 then communicates the transaction 26 to a back end transaction processing destination, e.g. members 29, according to the selected processing stream 28. Examples of the transaction stream 28 can include ACH, Reproduce Paper, Stop, and Remittance. It is recognised that a portion of the functionality of the decisioning engine 24 can be handed over (configured) to the client system 12 using a local decisioning engine 502 (see FIG. 6, so as to provide for pre-decisioning of the image/data 20 before receipt by the host system 14. In this aspect, the decisioning function can be shared or otherwise coordinated between the host 14 and client 12 systems in order to provide a distributed decisioning environment 501 (see FIG. 13). It is recognised that the network system 10 can have a plurality of the client systems 12 connected to the host system 14 and associated decision engine(s) 24.

It is also recognised that the network system 10 can be represented as an image management and transaction system (ITMS), web-based, that facilitates the electronic deposit and settlement of payments received by the paper checks 18. The network system 10 is designed to accommodate one or many points of distributed payment collection, i.e. one to many client systems 12. The network system 10 is comprised of the two main components, Client 12 and Host 14 systems. The Client 12 and Host 14 can be secure integrated networked components that work together to facilitate various methods of payment processing. The network system 10 provides support for Electronic Check Conversion (ECC) for point-of-purchase (POP) and accounts receivable (ARC) payment types as well as Check 21 initiatives. ARC is the process of converting a consumer check payment (e.g. image/data 20) for eligibility into an Automated Clearing House (ACH) debit transaction 26 in a lock box payment environment. ARC allows billers (e.g. client system 12) to image the paper document 18 as a source document and convert the paper to an electronic ACH debit (including the image/data 20) for processing by the host system 14. POP is a face-to-face transaction whereby the paper document 18 is converted to an ACH eligible debit transaction 26 at the point-of-purchase and the cancelled paper document 18 is immediately returned to the customer.

The Client system 12 can be configured as a Windows-based application that can reside on any workstation running Windows, with both browser-based and terminal applications available. The Client system 12 provides the interface to a peripheral check reader (e.g. scanner 16) that captures the image of the check (e.g. paper document 18) as well as account and routing information from the MICR (Magnetic Ink Character Recognition) line of the paper document 18, as identified by the scanner 16. The Client system 12 allows additional payee or biller information to be added to transaction data for assembly as the image/data 20. The Client system 12 also provides proofing and batch balancing features. The Host system 14 can be a secure enterprise scale server system operated by RDM. The Host system 14 has for example three primary functions: transaction 26 consolidation and routing, image/data 20 archiving, and administrative reporting of the decisioning 812 and settlement 110 processes (see FIG. 11) as well as the status of the registered/stored image/data 20 in the database 22. The transaction consolidation function of Host system 14 prepares and formats ACH transaction 26 files for delivery to any 3rd party ACH processor (e.g. member 29) for electronic financial settlement. The decisioning used by the decisioning process 812 can include such as but not limited to fiscal rules (e.g. less than a specified $ amount), OPTOUT—paper document 18 not okayed by paper document 18 issuer to be part of electronic processing, blocks—the paper document 18 type and/or issuer not accepted by a financial institution (e.g. member); stops—the paper document 18 type and/or issuer not accepted by payee; and ACH worthy/eligible.

It is recognised that the uploads/downloads of the image/data 20 can be done through example mediums such as ACH (further divided into POP—person present and ARC—person not present), TEL (ACH debits over the telephone), WEB (e.g. Pay Pal™), RCK (second time cheque presentment), and others. The captured images and their associated MICR/OCR data (e.g. image/data 20) are sent to a Payment Archive Service in real-time mode, as the transaction 26 is completed, or batch transmitted at the end of the day or shift. The image/data 20 is stored in Payment Archive, i.e. storage 22, for later retrieval by payment processors, transaction acquirers, merchants or any other authorized user. For example, images/data 20 can be retrieved 24 hours a day, 7 days a week, using web-based interfaces coupled to the host 14 or emailed directly to the authorized user in a report format. It is recognised that the host system 14 provides an image management solution that includes secured storage of images, and associated data, that have been captured by the scanning devices 16, such as RDM's EC6000i series. Retrieval of the image/data 20 from the host system 14, once stored, can include all associated data such as account number, check number, routing number, date and amount, that can be stored with the image, and can be used as search criteria to retrieve images of the image/data 20 from the storage 22. The host system 14 can be coupled to a user interface for straightforward image searches (e.g. from an administration or client/member usable tool 32), and has a hierarchal design to facilitate for varying levels of image access. Further, in an ECC (electronic cheque conversion) environment, the ACH processors of the members 29 can access the database storage 22 to request any check image/data 20 which are required in the processing of a returned check item, e.g. a result of NSF or Administrative returns. In a Bill Payment environment, the bill payment processor of the members 29 accesses images/data 20 from the database 22 to speed dispute resolutions.

The client system 12 can be a personal computer or other computing device for running software/hardware configured to; convert the paper document 18 into the digital image/data 20, upload the image/data 20 to the host system 14 via the network 11, receive acknowledgements 303 (see FIG. 5) as to the status of the transaction 26 related to the image/data 20 as well as the storage status of the transmitted image/data 20, and receive new/updates (e.g. configuration packages 209—see FIG. 1*b*) for scanner 16 software and computer software from the host system 14 (e.g. entry forms, GUI modifications, decisioning rules, etc. . . . ). The host system 14 could also be in communication with the third party customer server 30 for coordinating the upload of larger volumes of digital image/data 20 to the host system 14. It is recognised that the digital image typically would be accompanied in the upload by transaction data (e.g. check amount, payor, payee, etc. . . . ) associated with the digital image, (e.g. the combined image/data 20 package). This transaction data could also be stored in the storage 22 and/or communicated to the destination (e.g. member 29) of the associated transaction 26 once the settlement process 110 has been completed. The network system 10 also has the web administration and web research tools 32 for interacting or otherwise configuring and receiving information about the transactions 26 and/or digital image/data 20 stored in the database 20, as well as a customer server 33 for receiving image retrieval via a search web service 31. The network system 10 can also have customer servers 34 for receiving image and data batch responses from the host system 14 in view of manual and/or automated image/data 20 requests.

For example, it is recognised that the host system 14 can be configured as a web service(s) and/or other services such as but not limited to SQL Databases, IDL-based CORBA and RMI/IIOP systems, Legacy Databases, J2EE, SAP RFCs, and COM/DCOM components. The web service supplied by the host service can be defined as a software service, which can implement a network communication interface such as expressed using Web Services Description Language (WSDL) registered in Universal Discovery Description and Integration (UDDI) in a web services registry, and can communicate through messages with the client system 12 (and a DBS 36—see FIG. 5—if separate from the host system 14) by being exposed over the network 11 through an appropriate protocol such as the Simple Object Access Protocol (SOAP). In some implementations, SOAP is a specification that defines the XML format for the network messaging, including a well-formed XML fragment enclosed in SOAP elements. SOAP also supports document style applications where the SOAP message is a wrapper around an XML document. A further optional part of SOAP defines the HTTP binding (i.e. header), whereas some SOAP implementations support MSMQ, MQ Series, SMTP, or TCP/IP transport protocols. Alternatively, the host system 14 may use other known communication protocols, message formats, and the interface may be expressed in other web services languages than described above.

The host system 14 can implement a variety of functions, including as example decisioning, MICR swap, image QA report generation, and billing/invoice generation. In general, the host system 14 is responsible for coordinating the flow through of transactions 26 through the network system 10, including provisions for checks and balances (e.g. validation, acknowledgements, status, etc. . . . ) for archiving of the image/data 20 as well as image/data 20 receipt (i.e. acknowledged image/data 20 capture). This coordination can include verification, adherence to processing deadlines (stream 28 selection of a plurality of transactions 26 related to a plurality of image/data 20 received by a specified time deadline), security of the image/data 20 acquisition, storage, and transmission, and accommodation of image/data 20 volumes and associated transaction stream 28 selection and any additional transaction pre-processing as desired by the network system 10. The client systems 12 are coupled to the host system 14 via a data buffer system 36 and associated capture module 38, as further described below.

Example Configuration 201 of Client System 12

Figure 1:
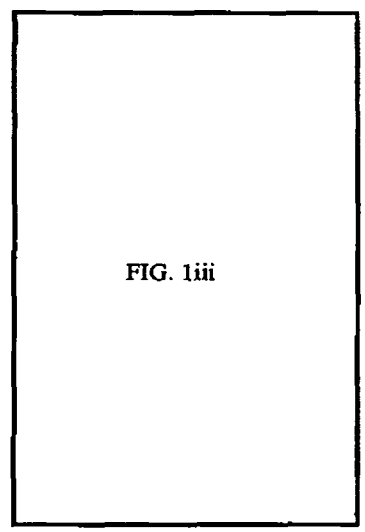
FIG. 1 is a block diagram of an electronic cheque storage and processing network system.
Figure 1I:
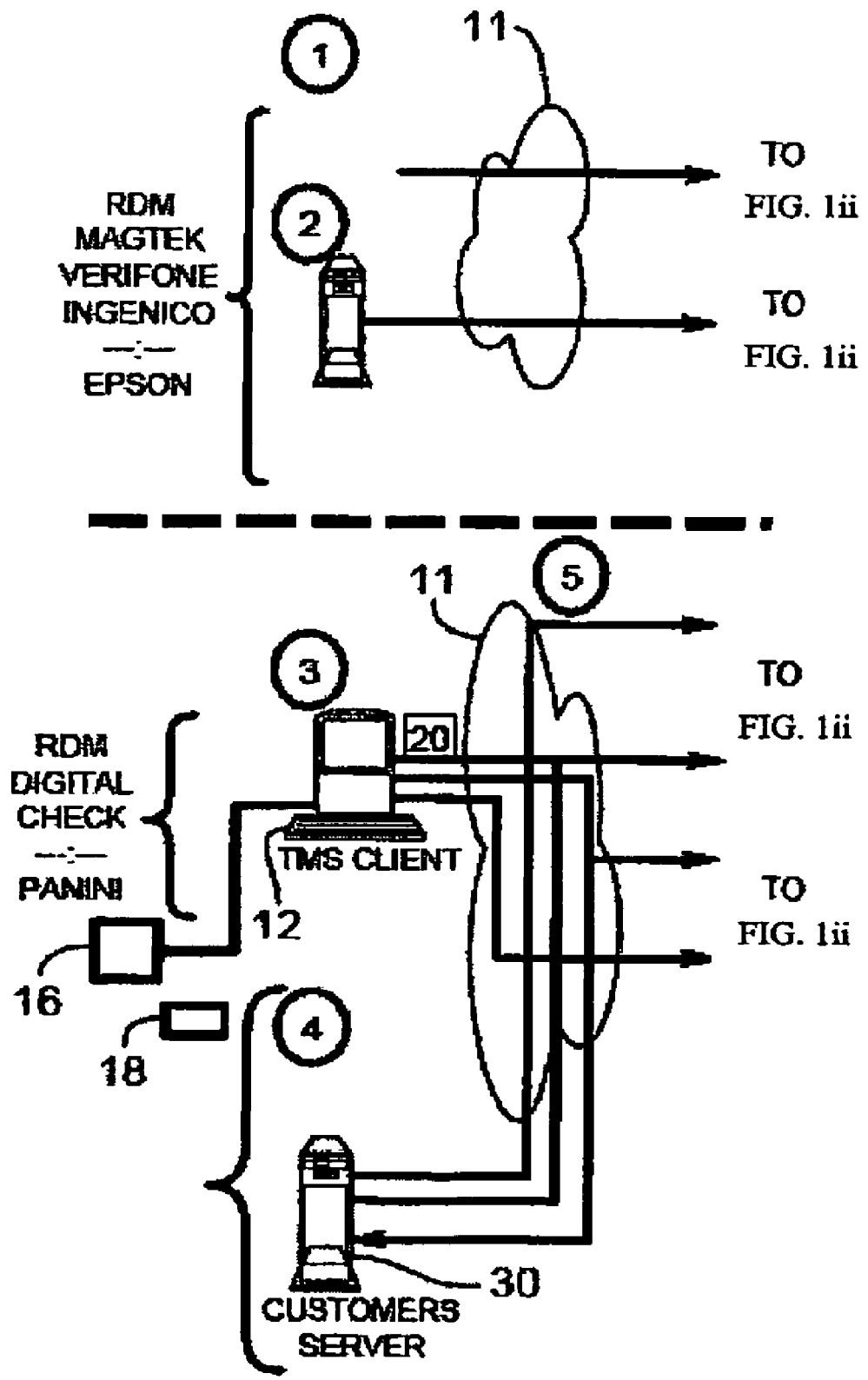
Figure 1I:
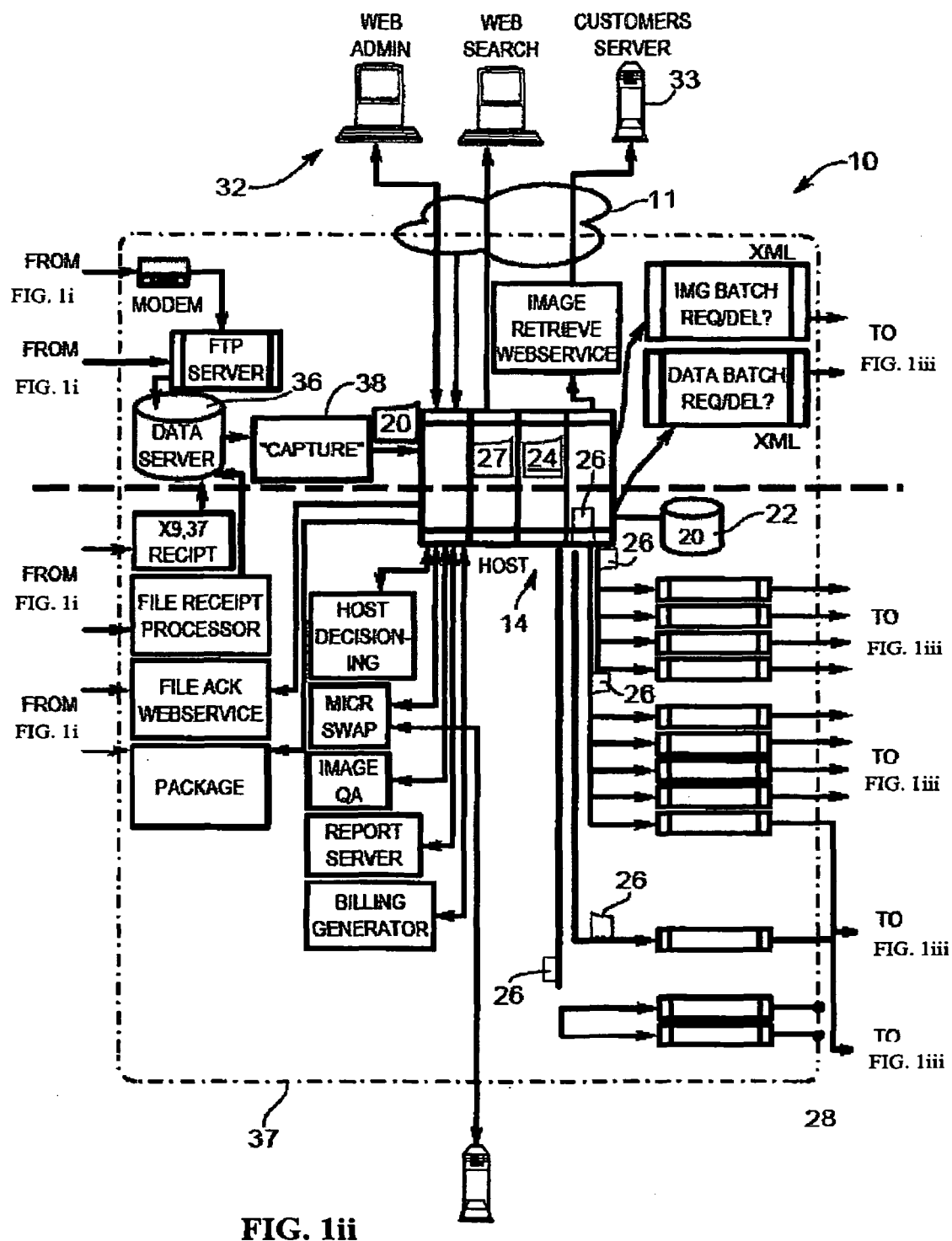
Figure 1B:
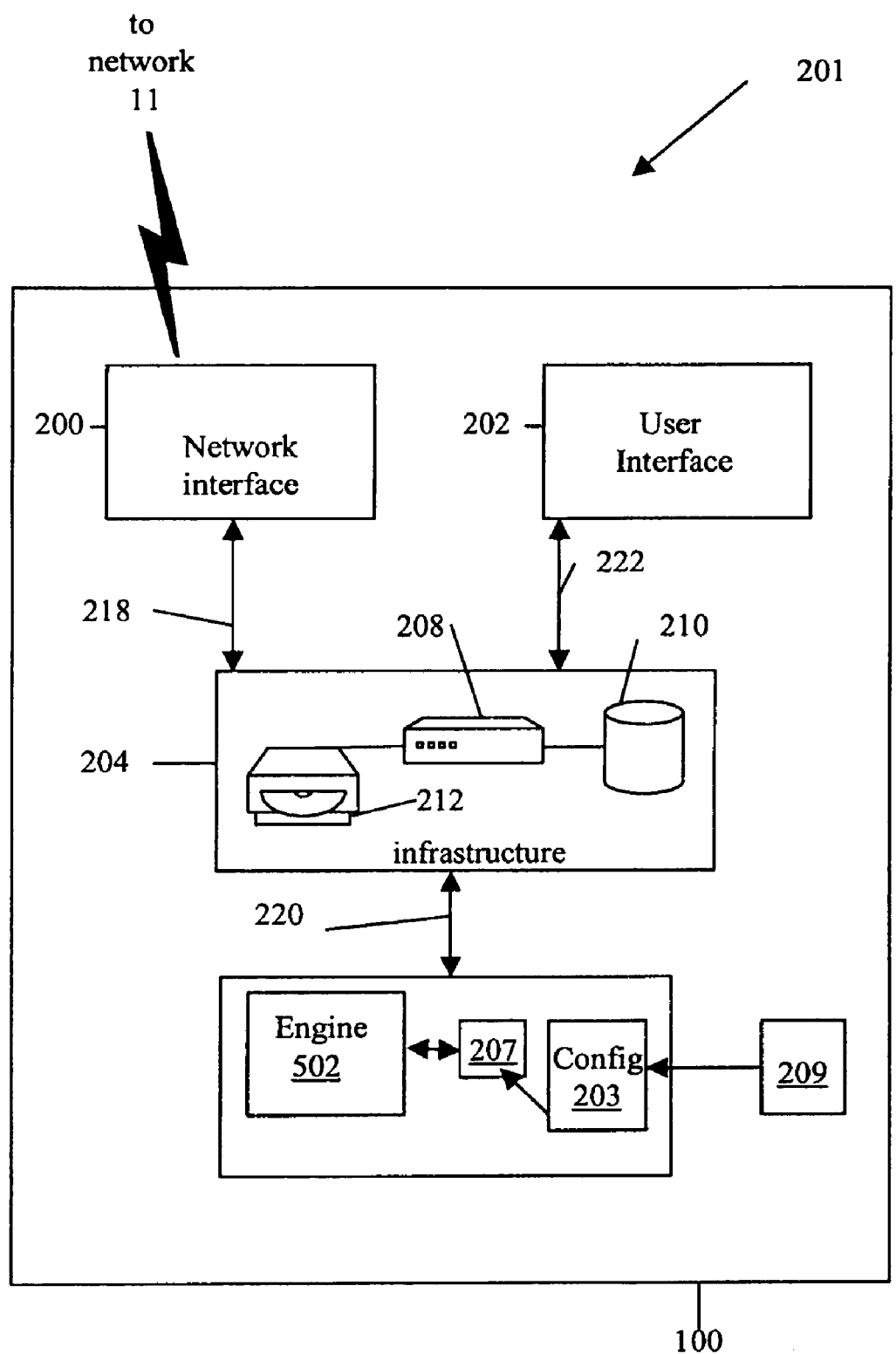
FIG. 1*b* is a block diagram of an example configuration of a client system of FIG. 1.

Referring to FIG. 1*b*, the client systems 12 can be devices and/or terminals including such as but not limited to wireless devices, servers, and work stations such as a PC. The client systems 12 include a network interface 200 (e.g. transceiver/ modem) coupled via connection 218 to an infrastructure 204. The network interface 200 is connectable during operation of the client systems 12 to the network 11 by a suitable channel, e.g. wireless RF or IR links or Ethernet connection, which enables the client systems 12 to communicate with each other (if enabled) and with external systems (such as the host system 12, the DBS 36 and/or the customer server 30) via the network 11. The network 11 supports the transmission of image/data 20 and associated messages (e.g. status and ACK messages as well as transmission of the transactions 26 and data access requests to the database 22) between client systems 12 and external systems, which are connected to the network 11.

Referring again to FIG. 1b, the client systems 12 also have a user interface 202, coupled to the infrastructure 204 by connection 222, to interact with a user (not shown). The user interface 202 includes one or more user input devices such as but not limited to a QWERTY keyboard, a keypad, a trackwheel, a stylus, the scanner 16, and a user output device such as an LCD screen display. If the screen is touch sensitive, then the display can also be used as the user input device as controlled by the infrastructure 204. The user interface 202 is employed by the user of the device 100 to coordinate the gathering of image/data 20, configuration/initialization of the infrastructure 204, and communication over the network 11 with the external systems.

Referring again to FIG. 1b, operation of the client systems 12 is enabled by the infrastructure 204. The device infrastructure 204 includes a computer processor 208 and associated memory module 210. The computer processor 208 manipulates the operation client components such as the network interface 200, the user interface 202, and a local decision engine 502 by executing related instructions 220, which are provided by an operating system and a configuration module 203 with related configuration data 207 (configured with assistance by the received configuration packages 209) located for example in the memory module 210. Further, it is recognized that the infrastructure 204 can include a computer readable storage medium 212 coupled to the processor 208 for providing instructions to the processor and/or to load/update the configuration module 203 with related configuration data 207 in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Example Configuration 250 of Host System 12

Figure 1C:
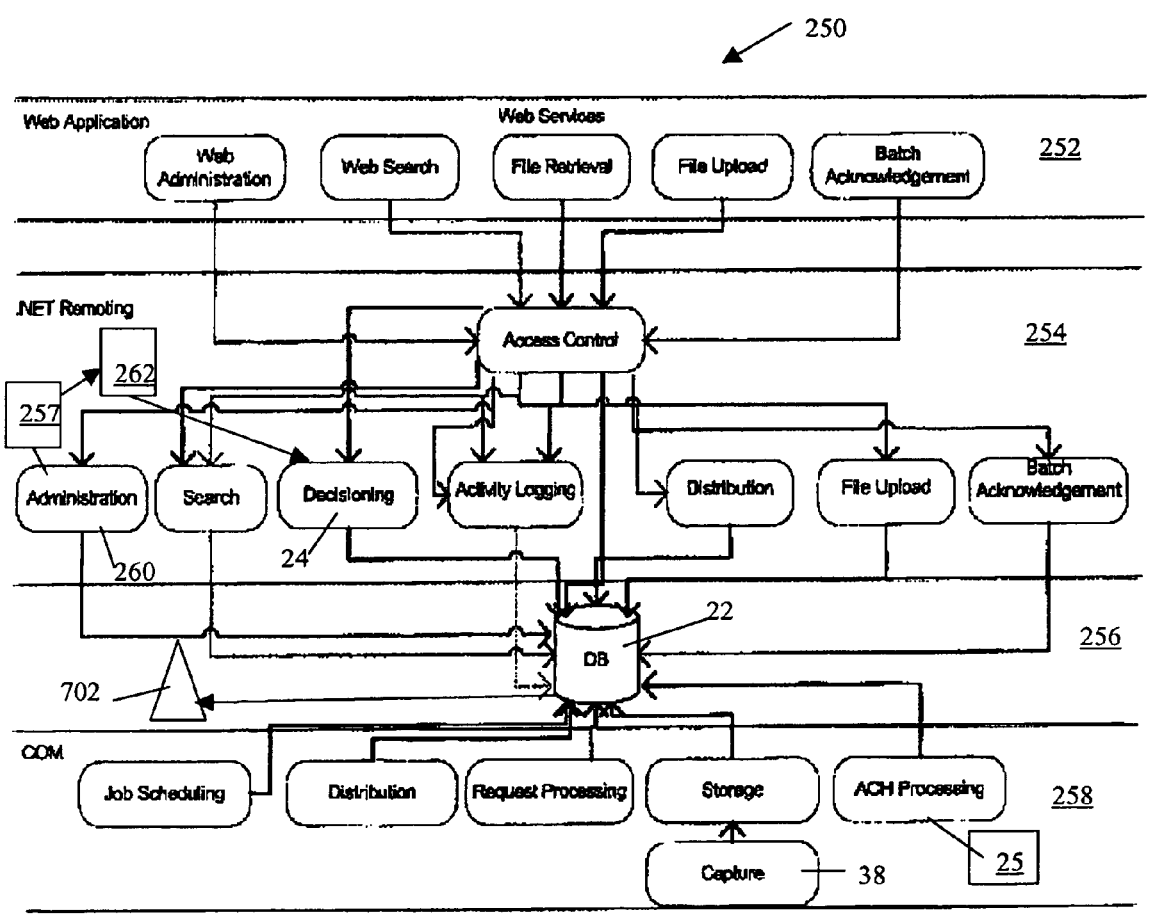
FIG. 1*c* is a block diagram of an example configuration of a host system of FIG. 1.
Figure 1D:
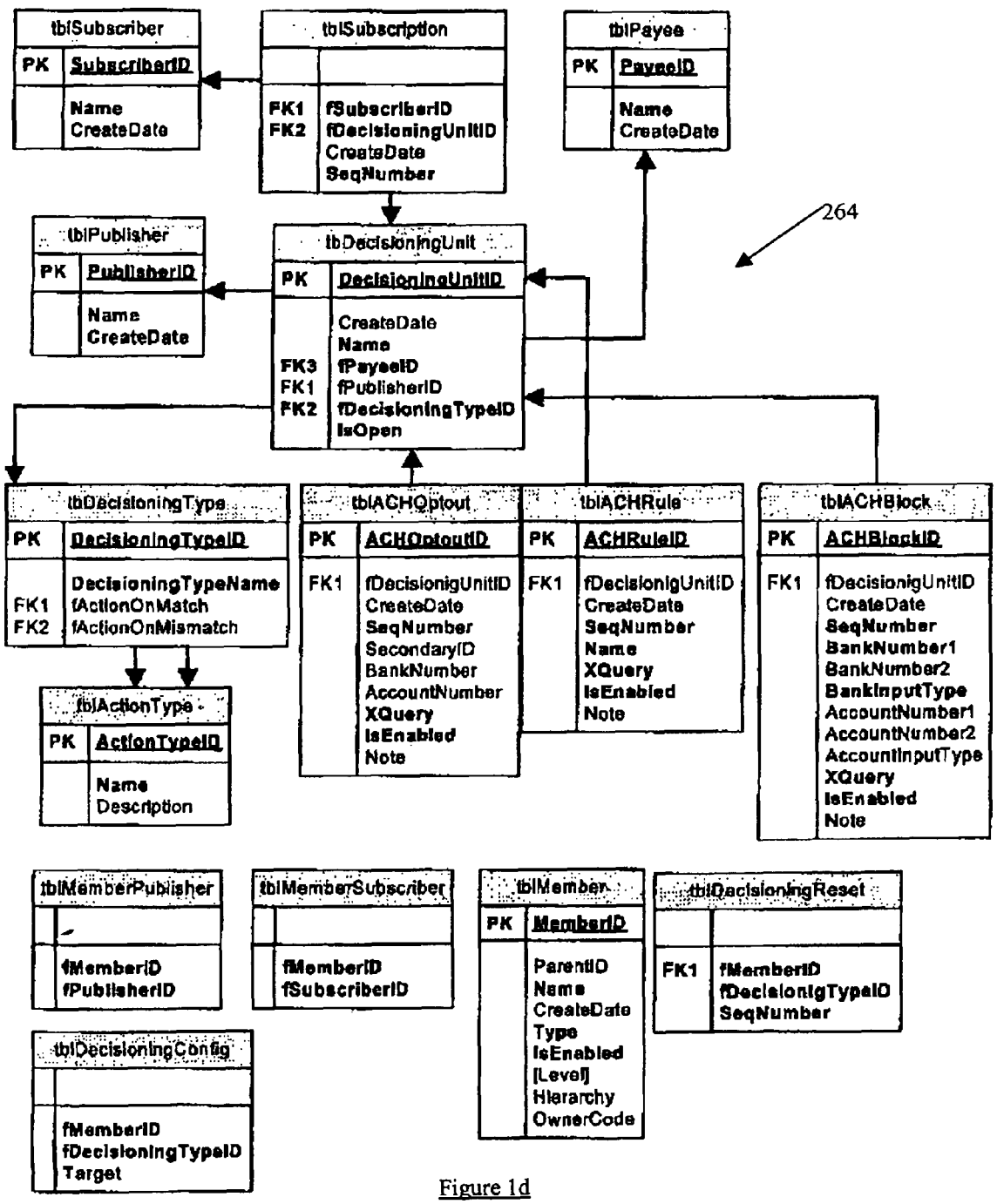
FIG. 1*d* shows an example schema for the image/data database of FIG. 1*c*.

Referring to FIG. 1c, the example host system 14 has a web services layer 252 for providing communication with the client systems 12, the DBS 36, and the administration tools 32, and the customer servers 33,34 (see FIG. 1a). The representative configuration 250 also has a workflow layer 254 for coordinating access to a database layer 256 using features such as but not limited to: administration module 260 including configuration by a configuration module 257 of the decision engine 24 (configured by configuration data 262) as well as the capture module 38 if applicable; searching; decisioning via the decisioning engine 24; activity logging; distribution; file upload; and batch acknowledgement. It is recognised that the functionality provided by the workflow layer 254 can be implemented as a series of respective software/hardware modules, as desired. The database layer 256 can also have the hierarchy 702 for coordinating operation of the various layers 252,254,256,258, as further described below. The configuration 250 also has a request layer 258 for coordinating communication with the members 29 and the DBS 36 (see FIG. 5). The request layer 258 can include features such as but not limited to: job scheduling; distribution; request processing; storage of images/data 20; and ACH processing implemented by the settlement module 25. It is recognised that the functionality provided by the layer 258 can be implemented as a series of respective software/hardware modules, as desired. Referring to FIG. 1d, an example schema 265 is shown for the database 22.

Further, it is recognized that the host system 14 can have an architecture (not shown) similar to the client system 12, namely including such as but not limited to the network interface 200, the infrastructure 204, the user interface 202, the computer processor 208, the memory module 210, and the computer readable medium 212.

Capture Module 38

Figure 8:
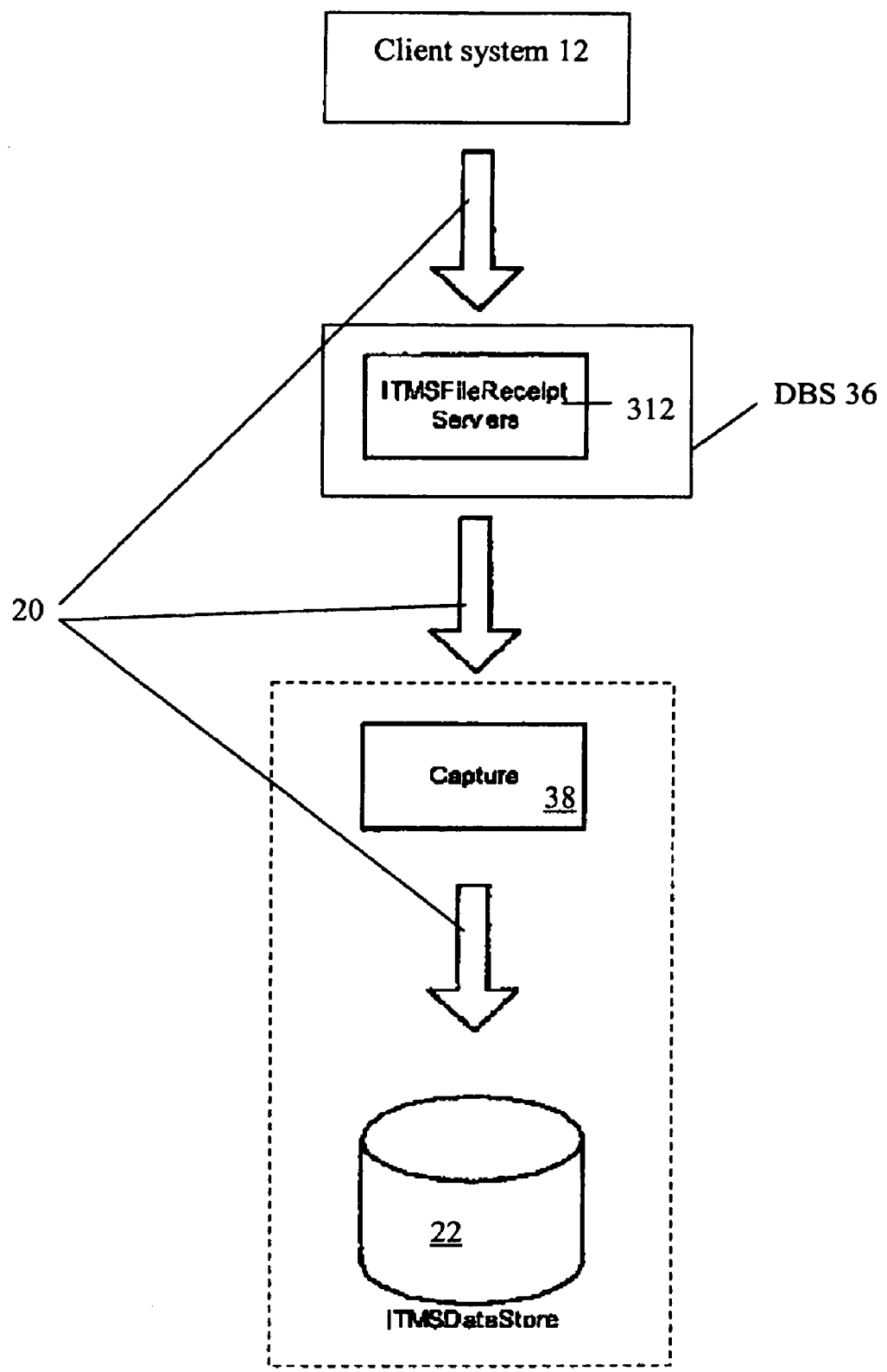
FIG. 8 shows further details of the capture module of FIG. 5.

The Capture module 38 (or service) is responsible for the storage of all image/data 20 received for the Host system 14 into the Storage Sub-System (i.e. database 22). These image/data 20 can originate from various external client system 12 sources, including such as but not limited to RDM EC5000x scanners deployed in the field connected to POS Terminals and PC-based Client applications. Various image/data 20 file and network communication formats are in use in the field and the capture module 38 (in conjunction with the DBS 36) can support them all as configured. Referring to FIG. 8, the Capture module/service 38 and it's context with the Host system 14 is illustrated. Accordingly, it is recognised that the capture module 38 can be part of the host system 14 or can be supplied by a third party (not shown) coupled to the host system 14 via the network 11. It is also recognised that the image/data 20 can include as well all captured transactional data for items decisioned at the client system 12 as STOP items, as desired.

Referring again to FIG. 8, incoming image/data 20 access by the Capture module 38 can be done using an FTP protocol to access the image/data 20 that have been deposited on the File Receipt Server modules 312 of the DBS 36. This can provide for configuration of the Capture module 38 to gather image/data 20 from any location on the network 11. The use of FTP could be exchanged for some other more secure transfer protocol, e.g. FTPS. As an example only, the Capture module 38 can be implemented as a standard Windows NT Service, can respond to Startup and Shutdown requests from an operator with the appropriate privileges (e.g. from an administration tool 37—see FIG. 1a). Further, the capture module 38 can run without requiring a user to be logged in to the hosting workstation, can be configured to startup automatically when the operating system of the hosting workstation boots up, the operating system of the hosting workstation can automatically shut the capture module 38 down when the hosting workstation is rebooted for whatever reason, and the capture module 38 can be monitored to ensure it is still executing to allow for operations (e.g. of the admin tool 37) to monitor the activity of the capture module 38 (e.g. facilitates tracking of the throughput of the capture module 38). Further, it is recognised that the capture module 38 can be implemented as a plurality of capture modules 38 communicating with one or more respective DBSs 36 (not shown), such that the plurality of capture modules 38 are hosted off the host system 14—hosted by the host system 14—or a combination thereof.

It is also recognised that the Capture module 38 can be implemented in such a way that it is easily extensible to support new file formats of the image/data 20 transferred throughout the network system 10, which can be implemented through application updates to the capture module 38 and other components of the host 14 and client 12 systems via the hierarchy 702 (see FIG. 1*d*), further described below. For example, the approach taken can be to expose a top-level class that determines the content of a current file used to configure the capture module 38, as supported by the host system 14, including image/data 20 format updates.

Further, the Capture module 38 can make use of components (e.g. part of the executable framework of the capture module 38) running in a COM+ environment, for example. COM+ provides a run-time environment for COM components that extends the functionality available to those components and also provides various features that improve the scalability of the software systems using these components. The Capture module 38 can leverage the following COM+ capabilities to improve the scalability of the capture service, such as but not limited to: Object Pooling—Object Pooling provides an mechanism whereby COM components can be pooled for future use for handling other requests; Just-in-time Activation—Just-In-Time Activation can help reduce the memory needs of the components by waiting to the last possible moment to activate the object in memory to handle a request. This can improve the scalability of the network system 10; and Constructor Strings—This is simply an efficient mechanism to pass configuration information into a component at run-time.

Figure 9:
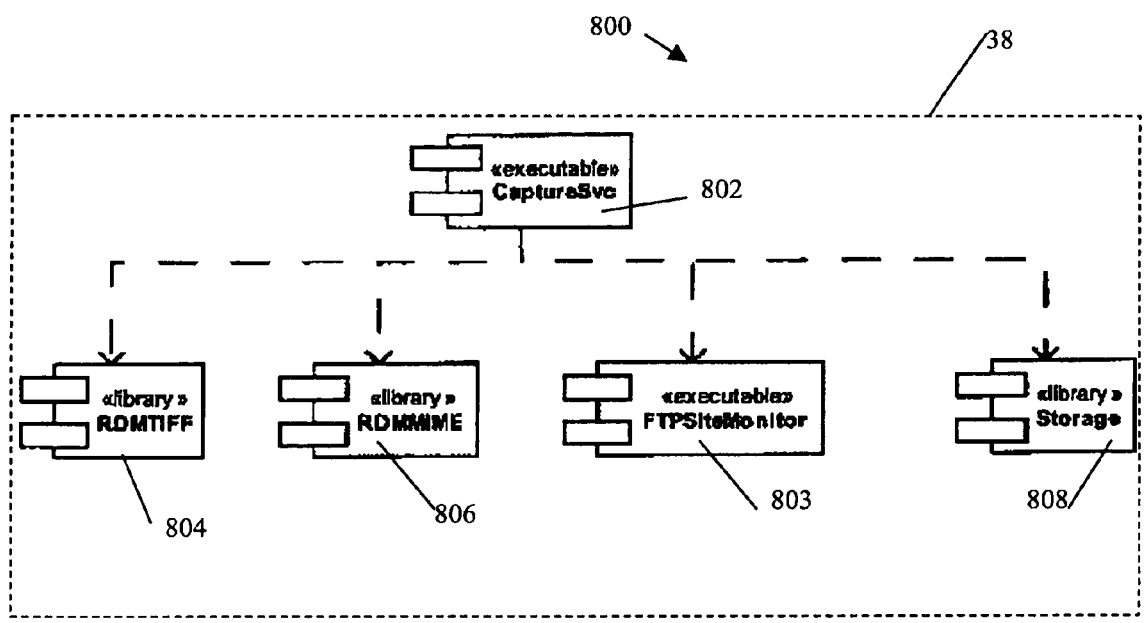
FIG. 9 provides an example embodiment of the capture module of FIG. 8.

Referring to FIG. 9, a system architecture 800 illustrates an example sub-system breakdown for the Capture module 38 as a whole. The Capture module 38 is responsible for coordinating the indexing and storage of all incoming image/data 20 into the Storage System supplied by the database 22. A PACaptureSvc component 802 can be an NT Service that responds to typical Service Control commands as such as StartUp and ShutDown. Upon startup, the PACaptureSvc component 802 initializes all required FTPSiteMonitor 803 components that provide FTP Site monitoring services for detecting image/data 20 available on FTP sites (e.g. of the DBS 36). The FTPSiteMonitor components 805 can notify the PACaptureSvc component 802 of the availability of these image/data 20 (e.g. image/data 20 available in the queue 300). The Capture module 38 uses a RDMTIFF 804 and a RDMMIME 806 helper component to extract/parse indexing information (e.g. representative information 306) from TIFFs and MIME-encoded files (e.g. image/data 20). A Storage component 808 is responsible for storing the indexing information (e.g. representative information 306) and image/data 20 into the database 22 as well as to update, where applicable, any tables external to the database 22, as further described below.

Figure 10:
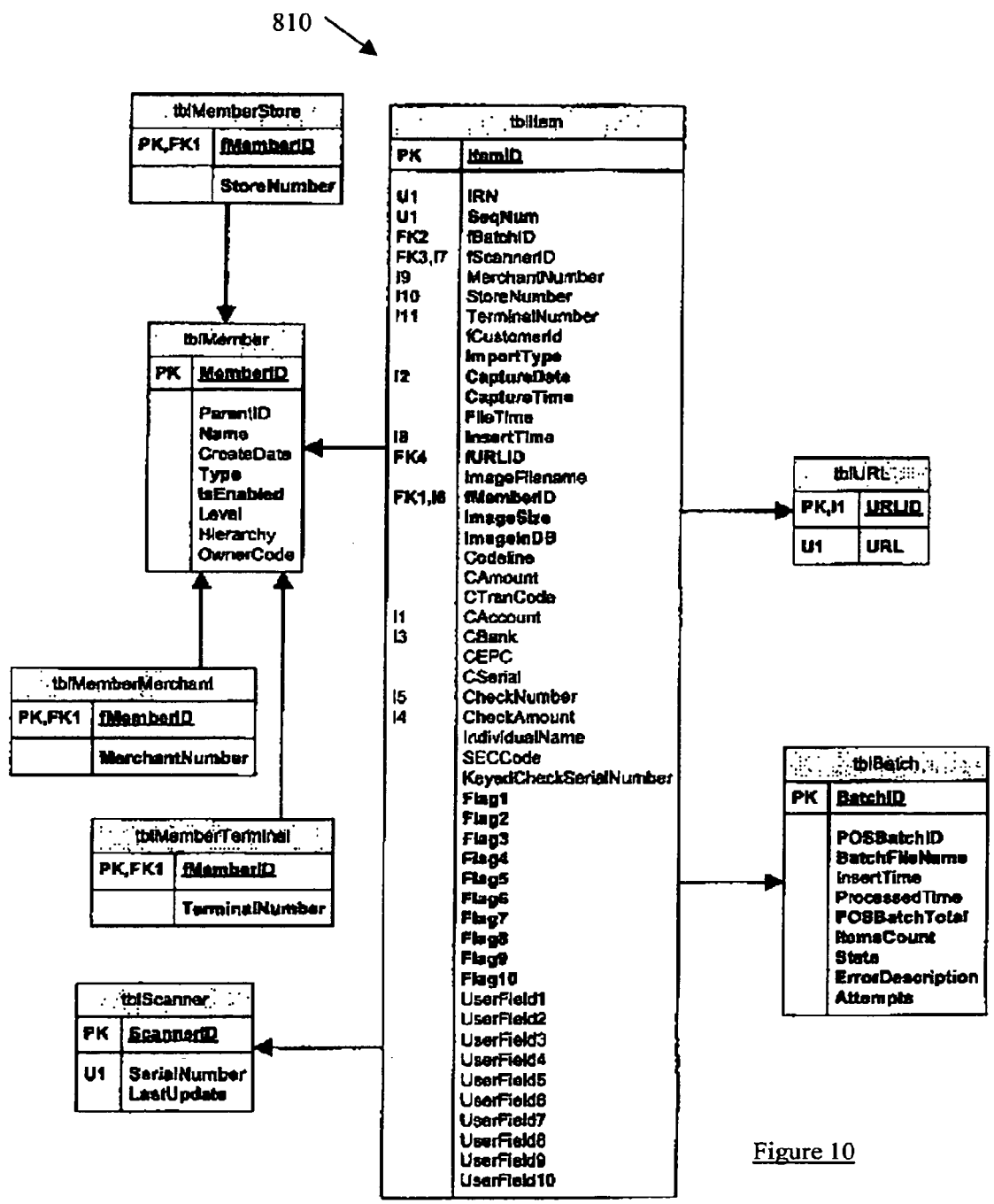
FIG. 10 is a block diagram of an example schema of the database of FIG. 5 applicable to the capture module of FIG. 9.

Image/data 20 file format (and associated features) supported by the Capture module 38 for the indexing and storage can be such as but not limited to: Standard RDM TIFF (EC5000s and EC6000s); MIME-encoded TIFF (Client 12); MIME-encoded TIFF with Batch Summary (Client system 12); and TIFF with XML (Mag Tek and VeriFone Scanners). further, referring to FIG. 10, an example portion 810 of a database 22 schema relevant to the capture module 38 is shown, for a plurality of the tables 326 (see FIG. 5).

Data Buffer System (DBS) 36

Figure 5:
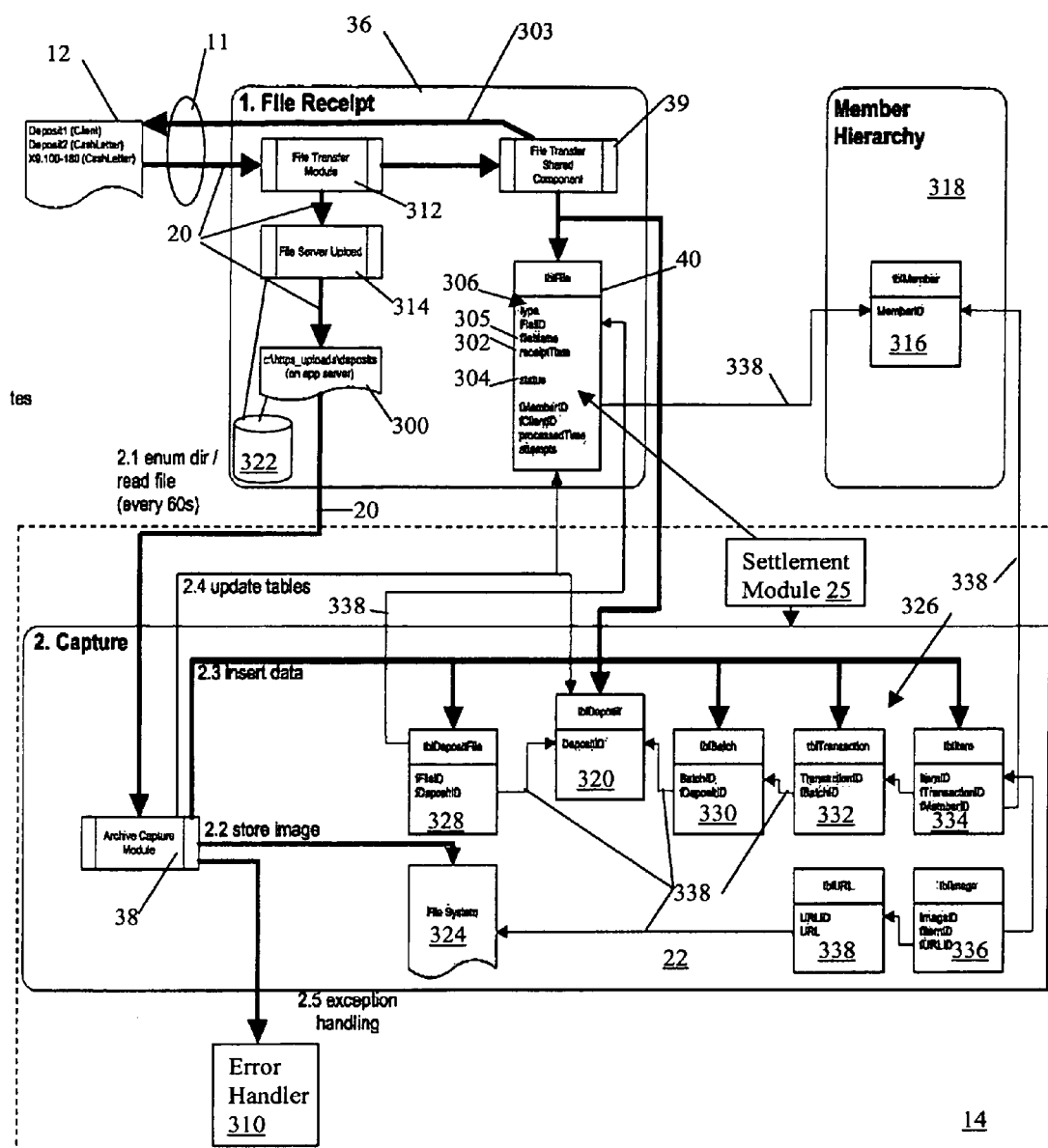
FIG. 5 show further detail of the data buffer system of FIG. 2.

Referring to FIG. 5, the DBS 36 is considered short-term or temporary storage of the images/data 20 (e.g. captured paper transactional data based on an original paper transaction) captured by the client systems 12 to help accommodate the orderly transmission of the plurality of images/data 20 (i.e. volume) to the long-term storage of the database 22 coupled to the host 14. The temporary storage can be defined as a storage state of the images/data 20 where reproduction of the images/data 20 is not always possible in the event of loss or otherwise failure of the temporary storage (e.g. due to storage device failure or error(s) in storing of the images/data in the temporary storage). Long-term storage, as considered by the database 22 of the host system 14, can be defined as an image/data 20 files that have been packaged together for backup, to transport to some other location, and for generally being able to reproduce the image/data 20 when requested by an entity external to the host system 14. The archived image/data 20 can include a simple list of files or files organized under a directory or catalogue structure. For example, in Unix-based operating systems, the tar (tape archive) utility can be used to create an archive or extract files from one. On mainframe operating systems such as IBM's MVS and OS/390, procedures for archiving or backing up files are often automated as a daily operation. Further, short-term storage provided by the DBS 36 can be defined as the initial area in which image/data 20 is stored for quick access by the DBS 3 and eventually the capture module 38, as compared to long-term or archive storage provided by the database 22 using more permanent storage devices such as but not limited to hard disk, diskette, CD, and DVD to collectively describe secondary or auxiliary archived storage. Further, long-term storage can be defined as storage for image/data 20 that is in active use in contrast to storage that is used for backup purposes (e.g. stored image/data 20 applicable to reproduction requests and settlement processes 110).

The DBS 36 and/or eventual database 22 records an exact time of a receipt of the image/data 20 by the DBS 36 through a receipt indicator 302, such that the time of receipt indicator 302 is used during the settlement 110 process further described below. The DBS 36 and the associated capture module 38 provide, as one aspect, a hardware/software solution for delaying the entry of images/data 20 into the database 22, in order to provide a shock absorber mechanism to account for high volumes of image/data 20 experienced by the database 22. The DBS 36 can employ a queue mechanism 300 (e.g. FIFO and/or FIAO) and delayed acknowledgement messages 302 of the image/data 20 received by the DBS 36 as well as transmission/capture status of the image/data 20 to the database 22 of the host system 14.

Referring again to FIG. 5, the DBS 36 has a file transfer module 312 that accepts image/data 20 packets/files transferred over the network 11 from the distributed client systems 12. The transfer module 312 can be represented as a web tier of the network system 10 for providing a central web interface/portal (e.g. web service) for a selected group (or all) of the client systems 12. Further, the transfer module 312 identifies any representative information 306 (e.g. header information of the image/data 20 file/package) included with the image/data for storing in a file table 40. The representative information 306 can include such as but not limited to: image/data type; file/package ID; file/package name; a priority indicator 302 (e.g. a receipt time indicator), hereafter referred to a receipt time indicator by example only); a processing status indicator 304 for indicating a real time status for the image/data 20, including received by the DBS 36 but not yet transferred to the host system 14, received by the host system 14 but not yet processed, received by the host system 14 and processed, or a combination thereof; a member ID of the members 29 associated with the image/data 20; a client ID for the client system 12 associated with the image/data 20 (e.g. POS); processed time indicating the amount of time taken by the host system 14 to update the status indicator 304 from received to processed; and an attempts indicator for representing the number of attempts were taken to properly receive the image/data 20 by the DBS 36, to properly receive the image/data 20 transferred to the host system 14, to properly process the image/data 20 by the decisioning engine 24 of the host system 12, or a combination thereof.

It is recognised that the file table 40 can be generically referred to as a physical/logical representation of a data structure for providing a specialized format for organizing and storing the representative information 306. General data structure types can include types such as but not limited to an array, a file, a record, a table, a tree, and so on. In general, any data structure is designed to organize data (representative information 306 and/or image/data 20) to suit a specific purpose so that the data can be accessed and worked with in appropriate ways. In the context of the present network system 10, the data structure may be selected or otherwise designed to store data for the purpose of working on the data with various algorithms executed by components of the host system 14, and the DBS 36 (if separate from the host system 14). It is recognised that the terminology of a table is interchangeable with that of a data structure with reference to the components of the network system 10. It is recognised that the representative information 306 can be stored in the file table 40, tables 326 of the host system 14, or a combination thereof, by example only.

Referring again to FIG. 5, the DBS 36 also has a shared component module 39 (also referred to as an acknowledgement module when acting in that capacity) for receiving the representative information 306 and storing it in the file table 40. Further, it is recognised that the shared component module 39 can provide updates to the representative information 306 of the file table 40, as well as add any additional representative information 306 not included in the received image/data 20 but desired by the host system 14 or other entities coupled to the host system 14 as part of the network system 10 (see FIG. 1a). Further, the shared component module 39 can update a member table 316 included as part of the member hierarchy 318 (e.g. part of the hierarchy 702 (see FIG. 1d). Accordingly, during the settlement 110 process, the module 25 can consult the member table 316 (e.g. a data structure) to determine if any image/data 20 have been received by the DBS 36 and are being processed or are otherwise in the process of being processed by the DBS 36 and/or host system 14. For example, it is recognised that the settlement module 25 (or a plurality of respective settlement modules 25) could be responsible for coordinating a particular settlement 110 process for a particular member 29, such that different members 29 typically have different settlement 110 procedures including cut-off times for receipt of image/data 20 from the client systems 12 for inclusion in the upcoming settlement 110 process (e.g. the cut-off time for receipt could be 4 PM for inclusion in the settlement 110 process recognising the respective transactions 26 for that day). It is also recognised that the tables 40 and 316 could be combined, as desired, and the member hierarchy 318 is hosted or otherwise available to the host system 14 and the settlement module 25 as appropriate for the desired functioning of the network system 10. Further, it is recognised that the shared component module 39 can generate and store a deposit ID in a deposit table 320 (of the host system 14) associated with the image/data 20 file/package identified by the file ID.

The representative information 306 can also be referred to as registration information such that the information 306 can represent indexing data for the captured image/data 20 such that the indexing data is stored in the tables 326 to facilitate subsequent retrieval of the stored image/data 20 when requested from the host system 14. the indexing data (i.e. part of the representative information 306) can include information such as but not limited to: the time the image/data 20 arrived at the DBS 36 and/or the database 22; the time the image/data 20 was registered in the database 22; the filename of the image/data 20 or other identification; and the status of the image/data 20 (e.g. decisioning status, storage status, settlement status, etc. . . . ). In general, the database 22 can be viewed as providing an archival type storage system for the images/data 20 (as well as their associated transaction 26 data) that are received from a remote data source (for example), in order that the stored/archived images/data 20 (as well as their associated transaction 26 data) are robustly available for later processing, viewing, and/or retrieval.

The exception module 25 handles situations in which certain image/data 20 are deemed not storable (i.e. eligible for registration with the database 22). These situations can include exception criteria such as but not limited to: duplicate image/data 20 such that the image/data 20 being captured is a duplicate of image/data already in the database 22; bad batch file meaning that the format of the image/data 20 submission is not supported by the database 22 (e.g. supported file formats can include deposit, batch, Tiff, etc. . . . ); general insertion exception such that a bad attempt is identified for insertion of the complete contents of the image/data 20 (e.g. as a file, batch, individual item, etc. . . . ) into the database 22 and may be eligible for an insertion retry; invalid member ID such that the member 29 associated with the image/data 20 is part of the member hierarchy 318 (e.g. this can be checked by the DBS 36 and/or the host system 14—such as by the capture module 38); invalid scanner exception such that the image/data 20 may originate from a non-supported scanner 16 (see FIG. 1a) manufacturer; minimum information exception where the image file of the image/data 20 and/or the data portion of the image/data 20 are deemed to not contain the minimum amount of transactional information (e.g. IRN and owner code) to allow the transaction 26 to proceed. It is recognised that at least part of the exception criteria can be used by the capture module 38 and/or the decisioning engine 24. Further, it is recognised that the capture module 38 and/or the upload module 314 (or other appropriate component of the DBS 36) can delete the stored copy of the image/data 20 once the image/data 20 has been successfully stored/registered in the database 22. It is recognised that the use of terminology "file" (exchangeable with the term image/data 20 where applicable) does not necessarily imply "image", as the receipt of the files by the DBS 36 may not concern the actual contents and/or format of the received file, and as such the received file by the DBS 36 may contain multiple images and associated data.

Referring again to FIG. 5, the DBS 36 has a file upload/download module 314 coupled to the file transfer module 312 for coordinating entry of the image/data 20 in the queue 300. The module 314 can organise or otherwise format/pre-process the communication package containing the image/data such that the image/data 20 is consumable by the capture module 38 in a predefined/expected format. For example, the module 314 can assemble (e.g. combine or dissect) the received image/data 20 in the queue 300 according to predefined criteria such as but not limited to: batch size representing the desired batch by the capture module when polling (synchronous image/data 20 download) the DBS 36, where the batch size can be anywhere from one item record to a set plurality of item records 58 (e.g. a batch record 56 or file record 54)—see FIG. 4; image/data 20 combined for selected client system(s) 12; image/data 20 combined for selected member(s) 29; image/data 20 reorganised according to type, receipt time, or other desired criteria listed or not listed above; or a combination thereof. Further, the module 314 can apply some decisioning criteria to the received image/data 20 according to any of the decisioning criteria as part of the configuration data 262 (see FIG. 1d).

The queue 300 can include an overflow storage 322 (e.g. a rapid access disk) for accommodating throughput considerations when an unexpected volume of the image/data 20 is received by the DBS 36. Once the queue 300 is sufficiently emptied by transfer of the currently queued image/data 20 to the capture module 38, the contents of the overflow storage 322 can be transferred into the queue 300 for transmission (e.g. such as but not limited to every 60 seconds, or other appropriate time interval if not configured for real time transfer, or using other transfer criteria—for example when the queue 300 is approaching full storage capacity, or a combination of transmission criteria) to the capture module 38. Further, in the case where the module 314 cannot handle the influx of image/data 20 where pre-processing is implemented, any overflow image/data 20 can be stored by the module 314 in the storage 322 prior to pre-processing and entry into the queue 300. As an example, the module 314 can coordinate the input (and output) of image/data 20 with respect to the queue 300. For example, the module 314 can provide a status of the overflow storage 322 when in communication (e.g. asynchronously or synchronously) with the capture module 38 or other components of the host system 14 responsible for management of image/data 20 throughput for the host system 14.

Referring again to FIG. 5, the database 22 has a central storage 324 for the image/data 20 and a plurality of tables 326 (or other appropriate data structure) for storing representative information 306 of the image/data 20 as well as any data generated due to the processing (e.g. a result of the decisioning engine 24) and/or settlement 110 (e.g. a result of the settlement module 25) of the stored image/data. For example, the tables 326 of the host system 14 can include tables such as but not limited to: a deposit file table 328 for storing file IDs and deposit IDs representing the stored image/data 20; a batch table 330 for storing batch IDs and corresponding deposit IDS; a transaction table 332 for storing transaction IDs and corresponding batch IDs associated with transactions 26 connected to the stored image/data 20; an item table 334 for storing items IDs and associated transaction IDs and member IDs, an image table 334 for storing image IDs, item IDs, and URL IDs associated with the image/data 20; and an URL table 336 for storing the URL IDs and the URL associated with the image/data 20. It is recognised that connections 338 represent links between the tables 316,326,40 providing for automatic updates/propagation of the table data (e.g. update of the IDs of table 336 results in automatic updates of the corresponding IDs in other linked tables 316,326,40).

Further, it is recognised that configuration of these table connections 338 between tables 316,326,40 can be configured by a system administrator of the host system 14, for example. Further, it is recognised that the capture module 38 can actively store (e.g. insert, write) data content in selected tables 326 of the host system 14 associated with storing of the image/data 20 in the file system 324. For example, action "2.2 store image/data" by the capture module 38 to the file system 324 results in the associated insertion of data, represented by action "2.3 insert data", into tables 328, 330, 332, 334 and other tables 326 as desired. Further, once the actions "2.2 store image/data" and "2.3 insert data" are coordinated, the capture module 38 can otherwise implement or coordinate the updating (e.g. by action "2.4 update tables") of the data contents for tables 320 (of the host system 14) and 40 (of the DBS 36) to reflect the result/status of the actions with respect to particular image/data 20. For example, once the image/data 20 for a certain file name 305 is stored in the file system 324, or otherwise processed by the host system 14 as further described below, the capture module 38 can proceed to update the status indicator 304 of the table 40, thus signifying that the image/data 20 associated with the certain file name 305 is ready for inclusion in the corresponding settlement 110 process where all other settlement 110 process criteria have been met (e.g. receipt time indicator 302 shows receipt time earlier than the predefined cut-off threshold).

Referring again to FIG. 5, the capture module 38 also has a capability to pass received image/data 20 to an exception system 310 (either local or remote to the host system 14) via action "2.5 exception handling" in the event the received image/data 0 is determined not storable or otherwise process worthy by the host system 14 until additional exception steps are taken In general, it is recognised that the network system 10 can include a plurality (not shown) of DBSs 36 such that each DBS 36 provides an entry point of the image/data 20 associated with the client systems 12, connected to the respective DBS 36, for eventual acknowledgement and storage by the host system 14 (e.g. part of the web service front ended by the transfer module 312). It is recognised that transfer of image/data 20 between the DBS 36 and the database 22 can be done over the network 11 (or alternate network—not show—e.g. an intranet) as inter-device communication, between the DBS 36 and the database 22 where both are hosted as part of the host system 14 on the same device intra-device communication, or a combination thereof in the case where the network system 10 has multiple DBSs 36 distributed about the network system 10.

Figure 2:
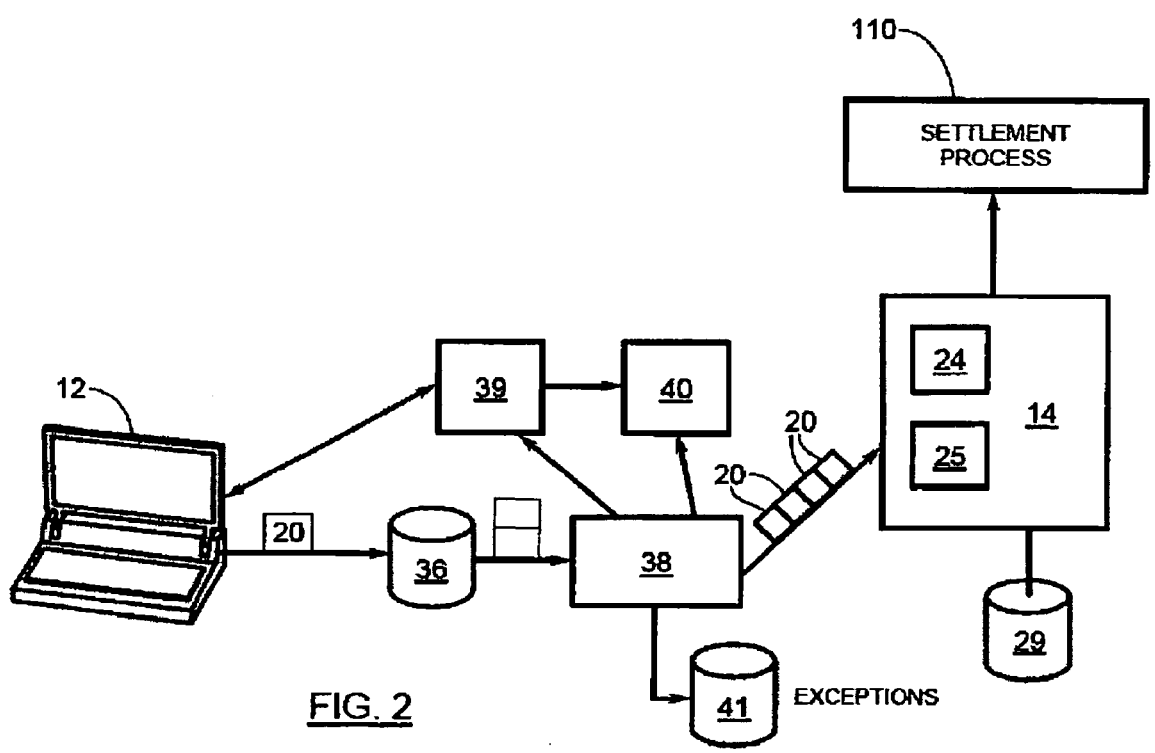
FIG. 2 is a block diagram of a data buffer system of FIG. 1.

Referring to FIGS. 2 and 5, operation of the DBS 36 and capture module 38 in conjunction with the settlement 110 process are further explained. The client system 12 uploads the image/data 20 to the DBS 36 which is then accessed by the capture module 38 from the queue 300 to coordinate the orderly entry of the images/data into the database 22 of the host system 14. It is recognised that the DBS 36 could also poll the client system 12 for available image/data 20 in order for the DBS 36 to upload the image/data 20 contents of the queue 300. The acknowledgement module 39 is informed of the receipt of the image/data 20 uploads to the database 22 on a case-by-case basis (or batch basis) by the module 38. The module 39 creates a file record in the file table 40, including the appropriate representational information 306 including the status indicator 304) to note that the image/data 20 file has been received by the DBS 36 (i.e. temporary storage), such that the image/data 20 status is noted in the file record as "received but not yet archived" by the indicator 304. Upon successful transfer of the image/data 20 from the queue 300 to the database 22, the module 38 eventually updates the status indicator 304 of the uploaded images/data 20 in the file record of the table 40 as "archived".

The acknowledgement module 39 in turn can inform or otherwise communicate to the client system 12 that the status of the image/data 20 in the file record in the table 40, including transactional status as desired. It is also recognised that during a settlement 110 operation implemented by the host decision engine 24, the settlement module 25 will access the table 40 to make sure that all images/data 20 received by the DBS 36 (i.e. transferred by the client system 12 before a image/data submission deadline) are included in the database 22 (accommodated by the inherent time delay due to processing/storage operations done to the image/data 20 by, or otherwise coordinated by, the DBS 36 and/or the capture module 38) so that the archived images/data 20 are included in the settlement 110 process (e.g. processed into appropriate transaction files 26 as further described below) for sending to members 29 associated with the settlement path 28. Accordingly, last minute entries (i.e. image/data 20 just before the cut-off deadline) to the DBS 36 are recognised by the settlement module 25, i.e. to be included in the settlement 110 process when archived, if presence of the last minute entries are reflected in the file table 40. It is noted that indication of the existence of the last minute received image/data 20 by the DBS 36 in the file table 40 conveys that those image/data 20 are eligible for settlement 110 but have not yet been archived (i.e. stored in the file system 324 of the database 22). it is also recognised that in the case of an exception arising, the specific image/data 20 would be taken out of the settlement 110 process as the status indicator of the 204 of the table 40 could be updated by the capture module 38 to reflect the error status, thus allowing the settlement 110 process to proceed without the erroneous or otherwise excepted image/data 20.

In operation of the above DBS 36, the client system 12 keeps checking back for acknowledgement from the ACK module 39. Further, for example, the module 38 interrogates the image/data 20 file type and image/data contents, inserts validated image/data 20 into the database 22 (typically in a batch mode based on a processing delay (e.g. 5-10 minutes) as well as sends an "archived" status to the module 39 through the table 40 after the processing delay (e.g. 10-15 minutes) such that the module 39 reports vi message 303 the "archived" status to the client system 12. Otherwise, the ACK module 39 could check the file records of the table 40 directly (as updated by the module 38) and then report back the status of the image/data 20 as retrieved from the associated file record. Use of the status indicators 304 of the various image/data 20 uploads/downloads to the DBS 36 could be for example, during the settlement 110 process the settlement module 25 kicks off at a specified time (e.g. 8 pm) and then proceeds to check all file records in the file table 40 until all records initially created by the ACK module 39 either have an "archived" status indicator 304 or an exception status indicator 304 (e.g. not deemed archive worthy) and instead the image/data 20 and associated transaction are excluded from the settlement 110 process and sent to an exceptions database 41 for reporting. Once the status of the image/data 20 as represented by the status indicator 304 indicates "archived", the client system 12 could be free to remove the image/data 20 from its local storage (i.e. the archived image/data is now the responsibility of the host system 12) for subsequent retrieval from the database 22 in the future, if needed.

Figure 3:
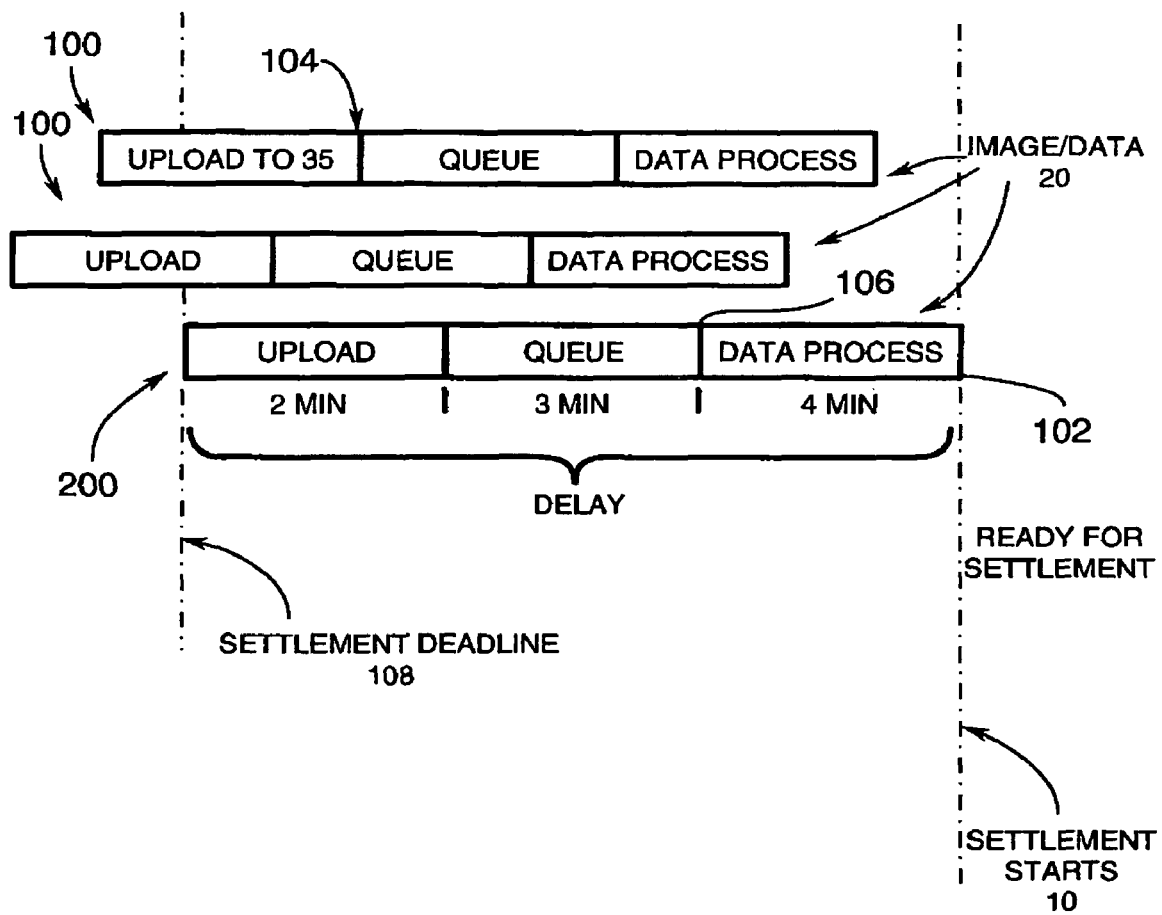
FIG. 3 is a an example timeline of the image/data uploads of FIG. 2.

Referring to FIG. 3, example individual timelines for respective image/data 20 uploads to the DBS 36 are shown. The settlement 110 process at point 102 in the timelines is a combination of uploading process of the image/data 20 to the queue 300 (e.g. 2 minutes) at point 104, sitting in the queue 300 (e.g. 3 minutes) until point 106, which at that time the respective image/data 20 are now resident "archived" in the database 22. The decisioning engine 24 will then make additional delay (e.g. 4 minutes) to the ultimate readiness of the archived image/data 20 for the settlement 110 process at point 102. It is recognised that the timelines represent all image/data 20 that were submitted to the DBS 36 before the settlement 110 deadline 108, e.g. 8 pm. Therefore the settlement 110 process of the settlement module 25 will start at point 110 when all records entered in the file table 40 are indicated as either status "archived" or status "exception", to help ensure that all image/data 20 uploaded by the client systems 12 to the DBS 36 (accepted as validated) before the cut off time are made part of the settlement 110 process by the settlement module 25.

Figure 4:
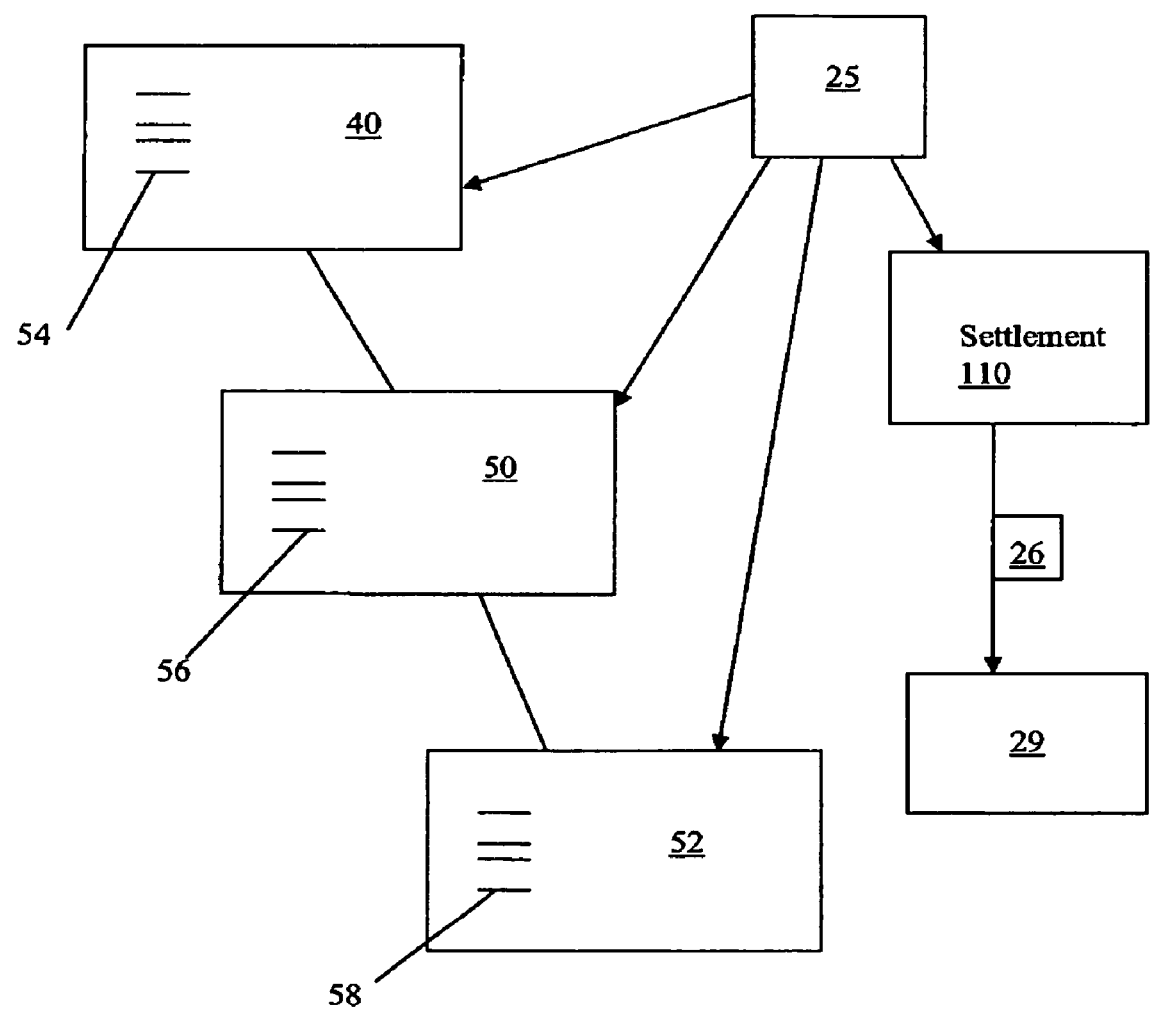
FIG. 4 is a further embodiment of the table file of FIG. 2.

Referring to FIG. 4, it is shown that the file table 40 can be further subdivided in to a batch table 50 and/or an item table 52, such that file records 54, batch records 56 and item records 58 are created by the ACK module 39 and updated by the capture module 38, depending upon the granularity of the system upload and archiving capabilities. For example, a file can consist of 10000 cheque image/data entries, which is subdivided into 50 batches of 200 items each. Therefore, the acknowledgement and ultimate inclusion in the settlement 110 process can be determined on the file/batch/item level as designed by the network system 10. Accordingly, any status flags set in the file/batch/item table records as archived would inform the settlement module 25 that these files/batches/items are to be included in the settlement 110 process. It is also recognised that the decisioning engine 24 could also set the status of the table 40 records to indicate that the particular files/batches/items have been processed and are therefore ready for settlement 110 (at point 102—see FIG. 3). Associated images/data 20 ready for settlement 110 are sent as transaction files 26 to the settlement path 28 for settlement 110 processing by the respective members 29, as described above.

Figure 6:
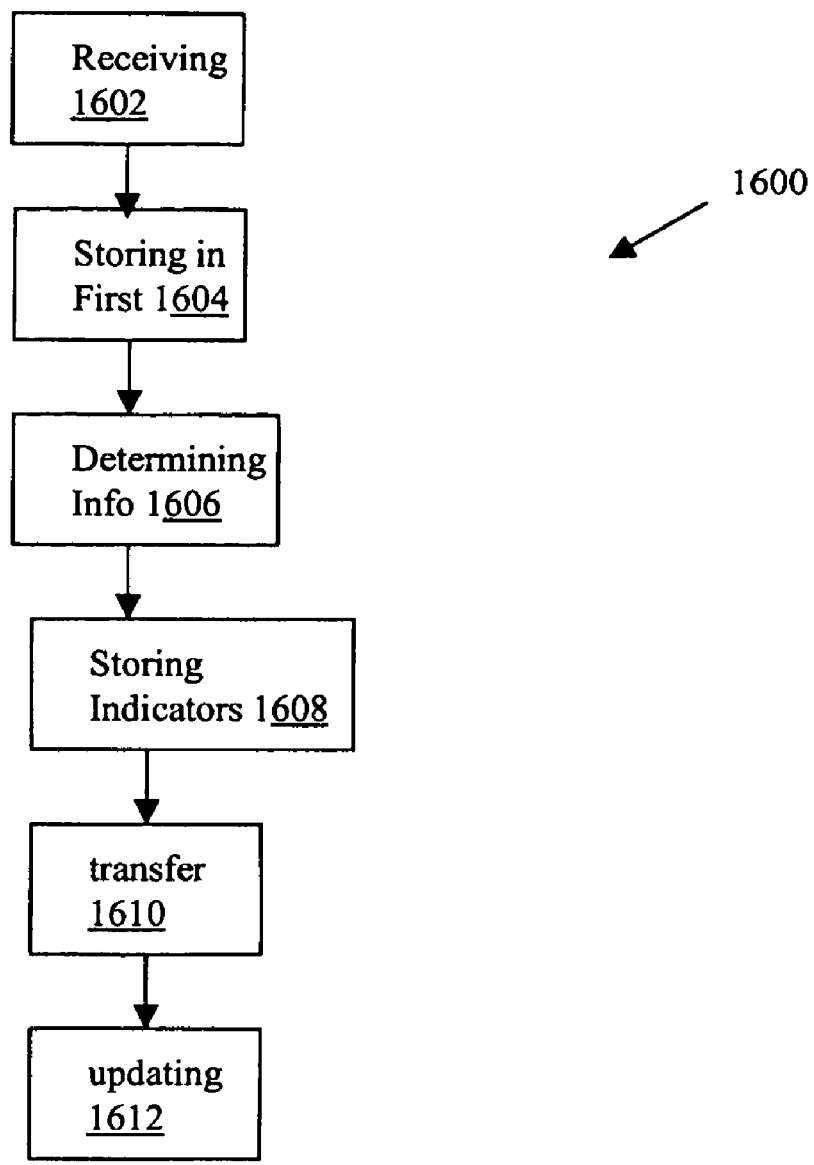
FIG. 6 provides an example operation of the data buffer system of FIG. 5.

Referring to FIG. 6, operation 1600 of the DBS 36 is shown for coordinating digital storage of the captured paper transaction data (i.e. image/data 20) based on an original paper transaction, such that the captured paper transaction data includes at least a digital image of the original paper transaction. The operation 1600 includes the steps of:

step 1602 of receiving the captured paper transaction data over the network 11 by the DBS 36;

step 1604 of storing the captured paper transaction data 20 in a first storage (e.g. the queue 300) such that the first storage is suitable for coordinating the transfer of the captured paper transaction data from the network 11 to a second storage (e.g. the file system 324);

step 1606 of determining representative information 306 of the captured paper transaction data 20 including the priority indicator 302 (optional) for the captured paper transaction 20 and the storage status indicator 304;

step 1608 of storing the priority indicator 302 (optional) and the storage status indicator 304 in a data structure (e.g. the file table 40) configured for access by a transaction processor (e.g. the capture module 38 or the settlement module 25);

step 1610 of transferring the captured paper transaction data 20 from the first storage 300 to the second storage 324 suitable for accommodating requests for access to a selected storage record by the transaction processor 38,25, the storage record for storing the captured paper transaction data 20 in the second storage 324e; and the step 1612 of updating the storage status indicator 304 in the data structure 40 to reflect the storage status of the captured paper transaction data 20 as stored in the selected storage record of the second storage 324.

Figure 7:
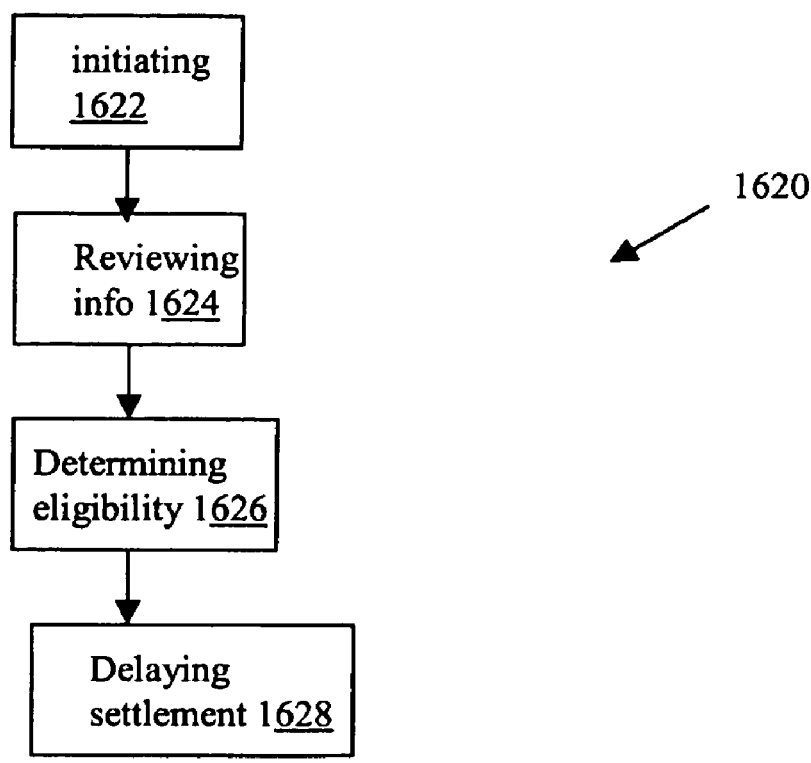
FIG. 7 provides an example operation of the settlement process of FIGS. 2, 3 and 4.

Referring to FIGS. 2 and 7, operation 1620 of the settlement module 25 is shown for coordinating the settlement process 110 of a plurality of captured paper transaction data 20 stored in the second storage 324, the plurality of captured paper transaction data 20 based on original paper transactions, and the plurality of captured paper transaction data 20 including digital images of the original paper transactions. The operation 1620 includes the steps of:

step 1622 of initiating the settlement process 110 once the processing threshold is reached;

step 1624 of reviewing the data structure 40 associated with the first storage 300 suitable for facilitating the transfer of the plurality of captured paper transaction data 20 from the network 11 to the second storage 324, the data structure 40 configured to contain representative information 306 of the plurality of captured paper transaction data 20 including at least the storage status indicator 304 for indicating when the captured paper transaction data 20 has been successfully transferred from the first storage 300 to the second storage 324;

step 1626 of determining which of the plurality of captured paper transaction data 20 are potentially eligible for the settlement process 110 based on a respective priority indicator 302 for each of the plurality of captured paper transaction data 20 satisfying the processing threshold; and step 1628 of delaying the settlement process 110 until all of the potentially eligible captured paper transaction data 20 are represented by the respective storage status indicators 304 as either successfully stored in the second storage 324 or as confirmed ineligible for the settlement process 110 based on the captured paper transaction data 20 being ineligible for storage in the second storage 324 (e.g. due to exception handling).

In view of the above described operation 1620, it is recognised that once the agents operating the client systems 12 have uploaded their deposits (e.g. image/data 20) to the Host system 12 via the DBS 36, the settlement module 25 consolidates the deposits at the scheduled deposit cut-off time, and then prepares and forwards the respective transactions 26 for the appropriate processing member 29 end-points as defined in the database 22 with respect to the details of the image/data 20.

Decisioning

Figure 11:
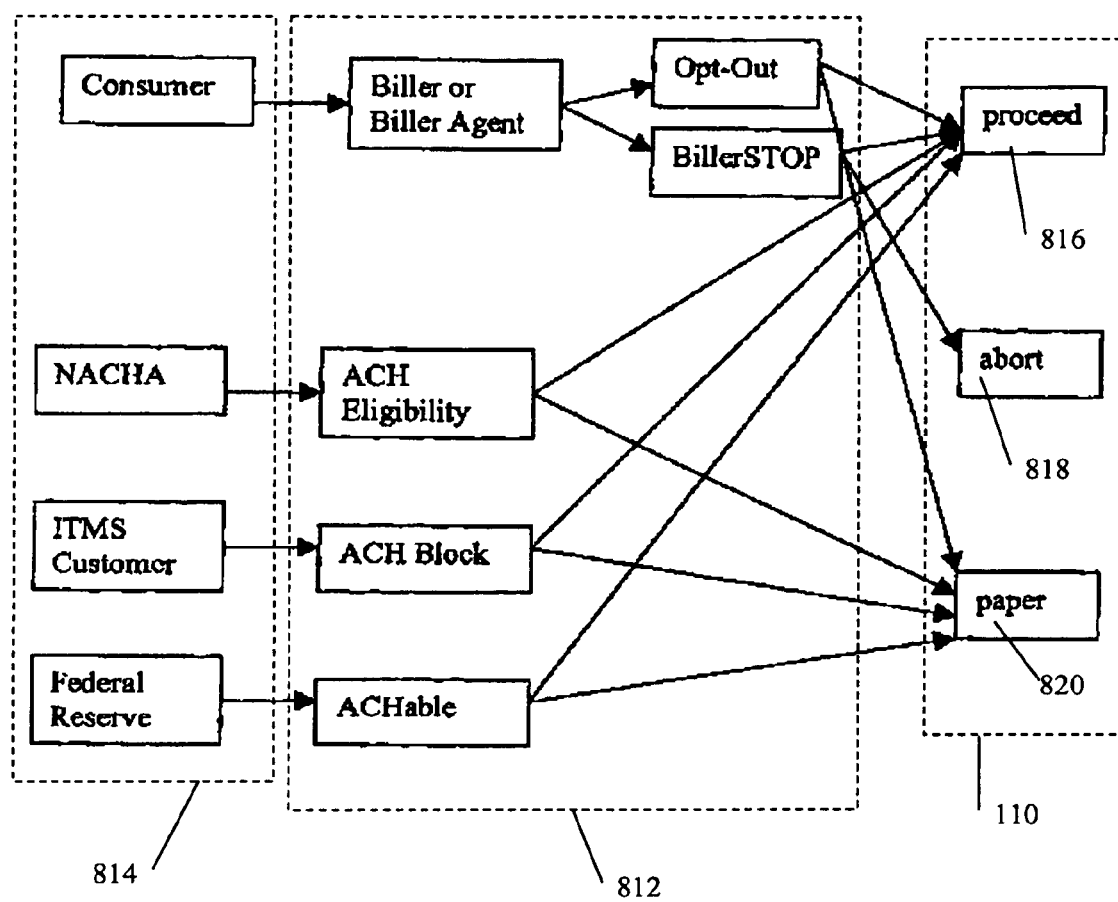
FIG. 11 gives a block diagram of an example decisioning process and a settlement process of the system of FIG. 1.
Figure 13:
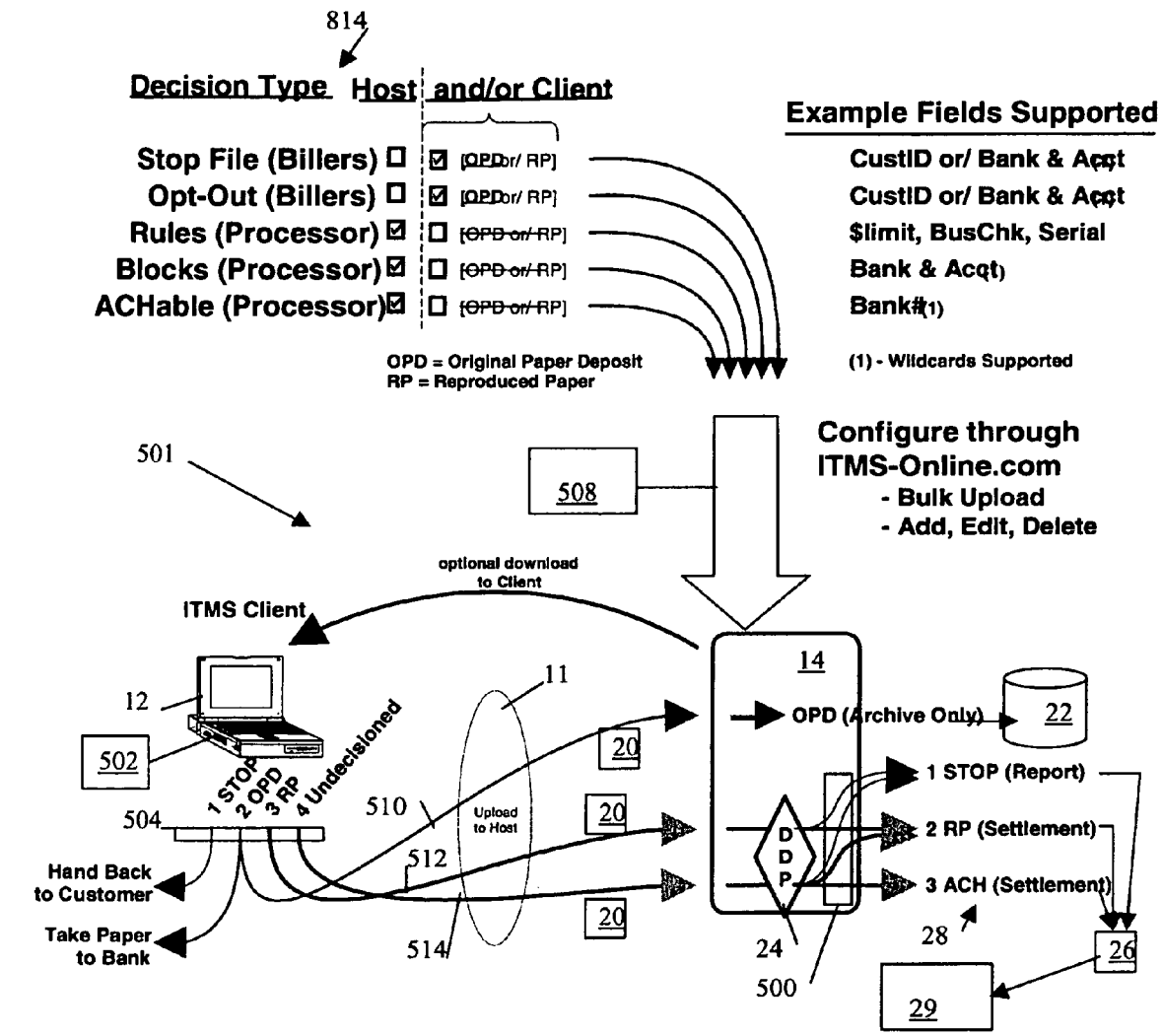
FIG. 13 is an example schematic showing further details of the distributed decisioning environment represented in FIG. 1.

Referring to FIGS. 13 and 11, the decisioning process 812 and the settlement process 110 are show in general with respect to example decisioning criteria 814, further explained below. The network system 10 decisioning system includes configurable engines 24, 502 for facilitating a centralized management of member-specific decisioning information (using decisioning criteria 814) in a configurable distributed decisioning environment 501. The distributed decisioning environment 501 is used by the network system 10 for the purpose of determining which payment (represented by the image/data 20) should be such as but not limited to; stopped 818, submitted to ACH for electronic processing 816, or handled as a paper item processing 820. The decisioning system environment 501 can be configured and maintained through a decisioning service or decisioning administration tool 508, which is assisted by the hierarchy 702 (see FIG. 16), further described below. The decisioning criteria 814 (including degree of distribution) are configured by the decisioning administration tool 508 and the downloaded to the client system 12 (e.g. a remote point of sale system (POS)) for use in configuring the local client decisioning engine 502. Accordingly, it is recognised that the client system 12 can have a subset of the central decisioning information, represented as decisioning criteria 814. In general, the host system 14 provides a mechanism for importing decisioning information (decisioning criteria 814) and keeping the remote decisioning of the client systems 12 up-to-date.

The distributed decisioning environment 501 utilizes a comprehensive set of decisioning filters 500, 504 (see FIG. 13) capable of providing item-by-item, for example, decisioning and transaction 26 routing. Regardless of the type of paper documents 18 presented for payment at the client system 12 (e.g. personal, corporate, money order, coupon, etc. . . . ), the distributed decisioning environment 501 will process the image/data 20 associated with the paper documents 18 (as well as the paper documents 18 themselves in the case where a capture of the image/data 20 is not permitted) based on how the distributed decisioning environment 501 is configured. As a result of its flexibility, the distributed decisioning environment 501 can be configured for at least some local item decisioning at the Client system 12, central item decisioning at the Host system 14, or a combination of both. Based on the pre-defined decisioning filters 500,504 (e.g. implemented by decisioning criteria 814 of Rules, Biller Stops, Check Writer ACH Opt-outs, MICR line Blocks and Bank ACHables) established for the distributed decisioning environment 501 by the decisioning admin tool 508, each paper document 18 is decisioned and thus routed to the most appropriate member 29 endpoint for use by the settlement process 110 in selecting settlement paths 28 such as but not limited to ACH or Image Replacement Document (IRD). For example, the distributed decisioning environment 501 can assume that all items (e.g. captured image/data 20) will be processed as ACH items. For items that are not eligible for ACH processing, such as but not limited to Corporate checks, money orders or consumer Opt-Outs, for example, the distributed decisioning environment 501 can be setup by the admin tool 508 to decision items for processing as either Original Paper Deposits (OPD) where the user will be instructed to deposit the items at the bank, or Reproduced Paper (RP) where the items will automatically be routed for processing as IRDs, for example. Items that are configured through the distributed decisioning environment 501 as "STOPS" cannot be processed either by host system 14 nor by one of the members 29 (e.g. a bank).

It is recognised that the distributed decisioning environment 501 can be provided as a subscription service for the respective client systems 12 that are part of the network system 10. For example, this subscription service can be administered through the admin tool 508 (for example via the web services layer 252 (see FIG. 1c) and initiated by assigning a subscribing organization (e.g. the members 29 and their associated client systems 12) a System Operator role with the appropriate permissions to configure the distributed decisioning environment 501 through the admin tool 508, for example in assistance with the hierarchy 702 (see FIG. 16). Accordingly, the System Operator would be responsible for the configuration set-up of the distributed decisioning environment 501, as further described below, including set-up of the decisioning criteria 814 as represented by configuration data 203, 262 (see FIGS. 1b,1c).

Referring to FIGS. 12a,b,c, further details of the example decisions for the image/data 20 resulting from the decisioning process 814 (see FIG. 11) and the settlement paths 28 resulting from the settlement process 110 are given. It is recognised that the network system 10 supports client system 12 and/or host system 14 decisioning operations on a per transaction (e.g. image/data 20) and/or group transaction basis. The decisioning process 814 can be defined as the routing of payments between the transaction starting point (e.g. the client systems 12) and the settlement endpoints 28. Referring to FIG. 12a, example settlement path endpoints 28 are shown to include stop, paper deposit, IRD, and ACH. Referring to FIG. 12b, example filter types 822 for the filters 500,504 (see FIG. 13) along with their example associated functions 824 in the distributed decisioning environment 501 are given. It is recognised that the associated functions 824 can be implemented by sub-filter modules, as desired.

Referring to FIG. 12c, the table identifies example configurations of settlement endpoints 28 with respect to the decisioning filter types 822 that the distributed decisioning environment 501 supports, including example distribution 826 of the decisioning filters 500,504 at the client system 12 and host system 14 to effect the distributed decisioning environment 501. It is recognised that, for example, any of the respective filter types 822 can be implemented at both the client system 12 and the host system 14. For example, the local decisioning engine 502, when configured by the decisioning criteria 814 supplied by the admin tool 508, can apply the stop filter type that provides a result of eligible for submission to ACH for electronic processing 816 (see FIG. 11). However, a subsequent corresponding stop filter type applied by the host system 14 decisioning engine 24 (once the resultant image/data 20 is sent to the capture module 38 for coordination of insertion to the database 20) can result in an override of the engine 502 decision, which provides a stopped 818 decision as a settlement path 28 for the image/data 20.

Client System 12 Decisioning

The client systems 12 for capture of the paper transaction data (e.g. image/data 20) are provided in the network system 10 as a series of distributed, remote (from the host system 12) client systems 12 responsible for image and transactional data capture and forwarding. The basic premise of the client systems 12 is that they are distributed data capture points of the network system 10 and the client systems 12 are configured to assist in the decisioning process ultimately monitored by the decisioning engine 24 of the host system 12. The client systems 12 can take on many forms, including such as but not limited to applications for a PC, a browser, a terminal based application, a mobile device, as well as single lane or multi-lane embodiments. The client systems 12 can connect to the network 11 (e.g. Internet) via the network interface 200, e.g. modem, dial-up, for example, as well as FTP and Internet IP based communications (e.g. HTTP).

The client system 12 can be referred to as a thick (client in that the client system 12 also has decisioning capabilities via the client decisioning engine 502 (e.g. pre-decisioning). Configuration of the client decisioning engine 502 is coordinated by configuration parameters 207 that are downloaded/uploaded as packages 209 at the client system 12 with respect to the host system 14. These configuration parameters 207 can be applied via the configuration module 203 to the client system 12 upon activation or otherwise sign-on to the system 10 (e.g. every morning any updates to the configuration parameters are applied to the client decisioning engine 502 and other aspects of client system 12 configuration).

In general, the client system 12 can stores the majority of content and functionality on the local hard drive 212 (see FIG. 1b) in order to implement part of the distributed decisioning environment 501 (see FIG. 13). An example is part of the decisioning process 812 (see FIG. 11) for the captured image/data 20 can be implemented locally on the client system 12 without having to wait for potentially delayed interaction with the host system 14 via the network 11 (e.g. reduce the need for accessing the host system 14 through an on-line connection, which normally causes some waiting time). One benefit of the thick client system 12 is that the captured image/data 20 content can be manipulated locally many times without having to wait for information from the host system 14 during processing of the captured image/data 20. This is compared to a thin-client embodiment of the client system 12, which would only display information about the captured image/data 20 without any on-board decisioning capabilities without interaction over the network with the host system 14, e.g. a typical thin-client system (not shown) would be an Internet browser that is set to store no information in its cache memory.

Referring again to FIG. 1b, client system 12 decisioning records (i.e. the configuration data 207 associated with the filters 504 of the decisioning engine 502, can be downloadable via the admin tool 508 (e.g. from the host system 14) the according to client systems 12 configuration settings. For example, the client system 12 can implement the decisioning filters 504 (see FIG. 13) including filter types such as but not limited to: NACHA eligibility rules (e.g. checks only); biller stops; consumer opt-outs; ACH eligibility rules; predefined network system 10 rules (e.g. custom rules provided by members 29); and Federal Reserve Receiver File blocks. For example, based on the above presented filtering types, the user of the client system 12 can be presented (via the user interface 202) a message if a decisioning hit is detected and if a check is the current paper document 18 or a coupon is the current document 18 and the decisioning endpoint is greater than that of any one of the previous checks by the filter types in for resulting in the corresponding transaction 26.

Example Transaction Flow of the Client Systems 12 Including Decisioning

Pre-decisioning actions taken by the client decisioning engine 502 can include processing such as but not limited to: duplicate items are monitored such that duplicate paper transactions can be identified by same bank, account, and check number as determined by a paper image parsing module (not shown). The client system 12 can also determine or otherwise pre-process which items belong in which batch files as well as which items belong in which item groups and files (containing a plurality of batches). Accordingly, the client decisioning engine 502 can guide the client system 12 user though manual, semi-automatic, and/or automated assignment and correction (if necessary) of items into their desired (either user configurable or system imposed or a combination thereof) categories, such as but not limited to item, item group, batch, and file, all of which can be part of the decisioning process to provide for more efficient downstream secondary decisioning at the host system 14. Assignment of the items into their corresponding categories can be done according to criteria such as but not limited to client ID, scanner ID, scanner type, payment type, associated member ID, etc. . . . An item can be defined as an image of a paper document plus its related data, either electronically captured or manually entered. A transaction 26 can be defined as a set of one or more items related to a selected payment transaction 26. A batch can be defined as a grouping of one or more transactions 26 processed over a period of time, as well as a grouping of one or more items.

The following are example workflows of the processing done by the client system 12 for the captured image/data 20. For example, the client system 12 can supports single ("key now") and batch ("key later") modes for each of the supported scanners 16 and example transaction profiles (such as but not limited to check only, singles, multiples) as described below.

"Check Only"
a) Single Mode, No Franking/Pocketing;
   If check 18 is inserted, run it to exit (EC)/pocket 0 (DCC) position, wait for user input;
   If user is typing, accept user input, wait for check;
   When last field is entered and front of the check 18 is scanned, decision the transaction by the engine 502;
   If the transaction is to be saved and back of check 18 is configured, wait for back of check 18 and scan it to exit (EC/pocket 0 (DCC) position;
   Save/rollback the transaction;
b) Single Mode, with Franking/Pocketing;
   If check 18 is inserted, run it into a hold position, wait for user input;
   If user is typing, accept user input, wait for check 18;

When last field is entered and front of the check 18 is scanned, decision by the engine 502 the transaction and frank or backout (EC)/pocket 0 (DCC) position;
Save/rollback the transaction;

c) Batch Mode, No Franking/Pocketing;
Present message window "Scanning in progress . . . " with button STOP;
If button STOP is pressed while the scanning is in progress the batch scan interrupts and the transaction flow moves to the next step;
(Capture) Scan all the documents 18 in BATCH mode;
(Keying) For each transaction images are retrieved using the GETIMAGES mode:
Show the check 18 image;
Wait for user input;
Decision the transaction by the engine 502;
If the transaction is to be saved, back of check 18 is configured and the scanner 16 is enables, show the back of check 18 image;
Save/rollback the current transaction and repeat the loop again for the next transaction;
"Cancel transaction" on any step will rollback the current transaction and repeat the loop again for the next transaction;
"Cancel transaction" on any step will rollback the current transaction and repeat the loop again for the next transaction;

d) Batch Mode, with Franking/Pocketing;
N/A (decisioning by the engine 502 may not be done without two-pass scan)
"Singles" (1 coupon, 1 check)

a) Single Mode, No Franking/Pocketing;
If coupon 18 is inserted, run it to exit (EX)/pocket 0 (DCC) position, wait for user input;
If user is typing, accept user input, wait for coupon 18;
When last field is entered and coupon 18 is scanned, decision coupon document 18;
The rest of the process is the same as in "Check Only" Single Mode, No Franking/Pocketing scenario;

b) Single Mode, with Franking/Pocketing;
If coupon 18 is inserted, run it to exit (EC)/pocket 0 (DCC) position, wait for user input;
If user is typing, accept user input, wait for coupon 18;
When last field is entered and coupon is scanned, decision coupon document 18;
The rest of the process is the same as in "Check Only" Single Mode, With Franking/Pocket scenario;

c) Batch Mode, No Franking/Pocketing;
Present message window "Scanning in progress . . . " with button STOP;
If button STOP is pressed while the scanning is in progress the batch scan interrupts and the transaction flow moves to the next step;
(Capture) Scan all the documents 18 in BATCH mode;
(Keying) For each transaction images are retrieved using the GETIMAGES mode:
Show the coupon 18 image;
Wait for user input;
When last field is entered, decision coupon document;
Show the check 18 image;
Wait for user input;
Decision the transaction by the engine 502;
If the transaction is to be saved, back of check 18 is configured and the scanner is enabled, show the back of check 18 image;
Save/rollback the current transaction and repeat the loop again for the next transaction;
"Cancel transaction" on any step will rollback the current transaction and repeat the loop again for the next transaction;

d) Batch Mode, with Franking/Pocketing:
N/A (decisioning may be impossible without two-pass scan)
""Multies"" (1 coupon, variable number of checks)

a) Single Mode, No Franking/Pocketing;
If coupon 18 is inserted, run it to exit (EC)/pocket 0 (DCC) position, wait for user input;
If user is typing, accept user input, wait for coupon 18;
When last field is entered and coupon is scanned, decision coupon document 18;
For each check 18 document:
If check 18 is inserted, run it to exit (EC)/pocket 0 (DCC) position, wait for user input;
If user is typing, accept user input, wait for check 18;
When last field is entered and front of the check 18 is scanned, decision the transaction by the engine 502;
If the transaction is to be saved and back of check 18 is configured, wait for back of check 18 and scan it to exit (EC)/pocket 0 (DCC) position;
If user clicks "End Transaction" go to the next step, otherwise repeat the loop again for the next check 18 document;
Save/rollback the transaction;

b) Single Mode, with Franking/Pocketing;
N/A (decisioning may be impossible without two-pass scan)

c) Batch Mode, No Franking/Pocketing;
Present message window "Scanning in progress . . . " with button END TRANSACTION;
(Capture) Scan all the documents in BATCH mode;
If button END TRANSACTION is pressed the transaction flow moves to the next step;
(Keying) Each document is retrieved using the GETIMAGES mode
Show the coupon image;
Wait for user input;
When last field is entered, decision coupon document;
For each check document;
Show the check image;
Wait for user input;
Decision the check document;
If the transaction is to be saved, back of check is configured and the scanner is an RDM EC6-series scanner, show the back of check image;
Repeat the loop again for the next check document;
Save/rollback the current transaction;
"Cancel transaction" on any step will rollback the current transaction;

d) Batch Mode, with Franking/Pocketing;
N/A (decisioning may be impossible without two-pass scan)

In view of the above, it is recognised that the workflow of the client system 12, as configured by example only, demonstrates the interactive nature of the local decisioning process by the engine 502 as part of the complete capturing process of the image/data representative of the paper document 18. A further example of the interaction between the decisioning of the local engine 502 of the client system 12 in view of the entire distributed decisioning environment 501 is shown below, consisting of the steps (also showing interaction between engine 502 and the user interface 202:

step a) Capture front image and code line data of the paper document 18;

step b) If errors are detected in the codeline the check 18 will be automatically rejected or the cashier will be prompted (e.g. by the engine 502) to correct it via a pip-up dialog box (configurable);

step c) The raw codeline will be displayed;

step d) reject characters (e.g. by the engine 502) will be highlighted for re-keying;

step e) If bank number on the codeline fails the ABA check digit algorithm (9 digit) the check 18 will be automatically rejected (e.g. by the engine 502) or the cashier will be prompted (e.g. by the engine 502) to correct it via a pop-up dialog box (configurable);

step f) If check 18 contains an "Aux on-up" filed, then the item shall be considered as a Business Check and either be automatically accepted (e.g. by the engine 502) or prompt (e.g. by the engine 502) the cashier whether to continue or cancel (configurable);

step g) Scanned item 18 shall be verified (e.g. by the engine 502) with a local verification database 210 based on check 18 codeline or transaction data entered into configurable fields on the form;

step h) If there is a record in the database 210 matching (e.g. by the engine 502) the current transaction the user shall be presented (e.g. by the engine 502) a blocking message and transaction will be rejected, Verification database records can be installed automatically with the client application on the client system 12;

step i) Enter Check 18 Amount for checking against maximum threshold value (e.g. by the engine 502)—where check 18 is rejected (e.g. by the engine 502) if above maximum, user shall be able to specify if the amount field should preserve last entered value to be used as a default in the next transaction;

step j) Enter User Fields (configurable);

step k) If an ARC mode, then capture rear image (configurable), as verified present by the engine 502);

step l) Capture configurable number of associated items;

step m) Print merchant or file receipt (configurable);

step n) Print customer receipt (configurable);

step o) the user may cancel the transaction at any time such that no other batch or application related action may be allowed until the transaction is complete;

step p) the incomplete transaction shall be automatically cancelled due to a timeout after a configured amount of time elapses since the moment it was started by the user; and step q) the accepted image/data 20 is sent to the host system 14 (via the DBS 36).

Example Decisioning Engine 502 Functionality

Referring to FIG. 13, the decisioning engine 24 (aka part of the dynamic decisioning portal DDP), receives all image/data 20 for secondary decisioning and routing processing for assigning to the appropriate settlement destination/path 28 (used by the settlement process 110), such as but not limited to ACH, aft, Image Replacement Document IRD, or image exchange. Further, the creation of paper drafts and image exchange items could also be supported. It is recognised that for image exchange the transaction data and image data (i.e. image/data 20) are only sent though the network system 10, with no physical paper check to follow. I is recognised that the physical form of the image/data 20 can be reproduced upon request from the host system 14. The engine 24 is located at the host system 14, for example, and has the set of decisioning filters 500 capable of providing item by item decisioning and transaction 26 routing. The engine 24 is configured to accommodate personal, corporate, money order, or other document images/data for decisioning and routing, for example. The engine 24 can be configured to interact (via the configuration module 257 and configuration data 262—see FIG. 1c) with local decisioning/routing at the client (using the local engine 502 with associated filters 504), can be configured for central decisioning/routing at the host system 14 alone using engine 24 and filters 500, or a combination of both such that the engines 24,502 share decisioning/routing capabilities. Based on the predefined filters 500,504 established or otherwise coordinated by the host system 14 via the admin configuration tool 508, the engines 24,502 can be configured for such as but not limited to: decisioning of items (extraction of the individual items from the batches which are extracted from the files—as given above); for processing as either Original Paper Deposits OPD where the user will be instructed to deposit the items at the bank; and Reproduced Paper RP where the items will be automatically routed for processing as IRDs. Items that are decided as STOPs cannot be processed as transactions 26 by either the host system 14 nor by the destination 29 (e.g. bank).

Example Operation of the Decisioning Engine 24

Referring again to FIG. 13, the client system 12 will receive updates or additions of the local filters 504 from the host system 14 that have been modified by the tool 508 operator. It is recognised that decisioning by the filters 504 can be overridden or otherwise changed by the filters 500 during the portion of the decisioning process 812 (see FIG. 11), such that the ultimate decisioning/routing for channelling the image/data 20 can be controlled by the host system 14. For example, the filters 504 can include such as but not limited to 1 stop, 2 opd, 3 PR, and 4 undecided. Stream 510 can be selected initially by the client system 12 for sending the image/data 20 to the archive (database 22) only. Similarly, stream 514 can be selected by the engine 502 and then sent to the engine 24 for ultimate decisioning as 1 stop, 2 RP or 3 ACH. Similarly, stream 512 can be directed without change when received by the engine 24. It is recognised that other changes to the streaming can be done by the engine 24 in response to initial received streams 510,512,514 as decided by the client system 12, thus resulting in the assigned settlement paths 28 for use in settlement process 110 for generation of the transactions 26 sent to the members 29. It is recognised that the override capability of the filters 500 of the engine 24 could be based on configuration data 262 providing for selection of the respective settlement path 28 according to a predefined priority of the filter types (e.g. filter STOP, if eligible, takes precedence over filter RP, if eligible, which takes precedence over filter ACH, etc. . . . ).

Further Embodiments Demonstrating Example Interaction Between Engines 24,502

Figure 12E:
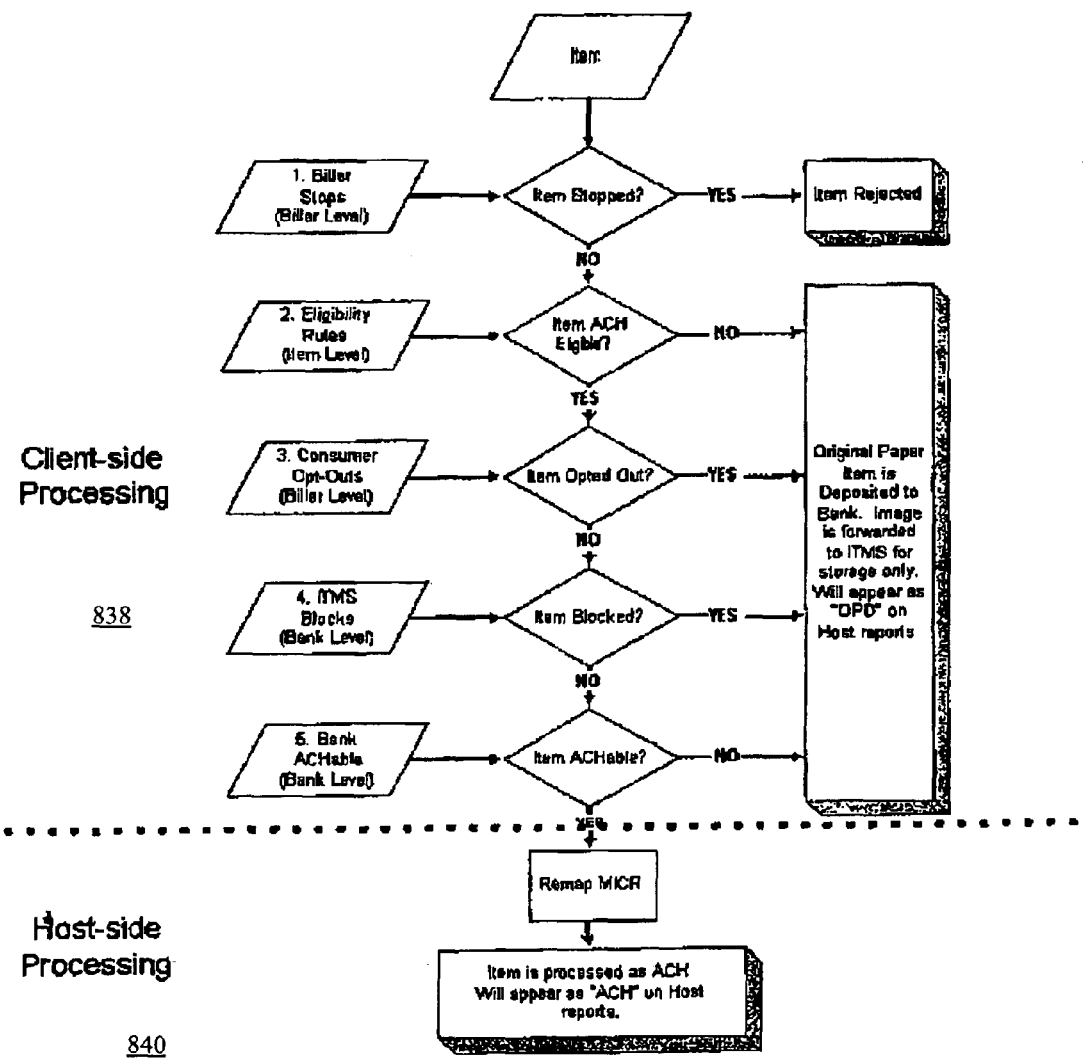
FIGS. 12*e,f,g* show further embodiments of the distributed decisioning environment of FIG. 13.
Figure 12F:
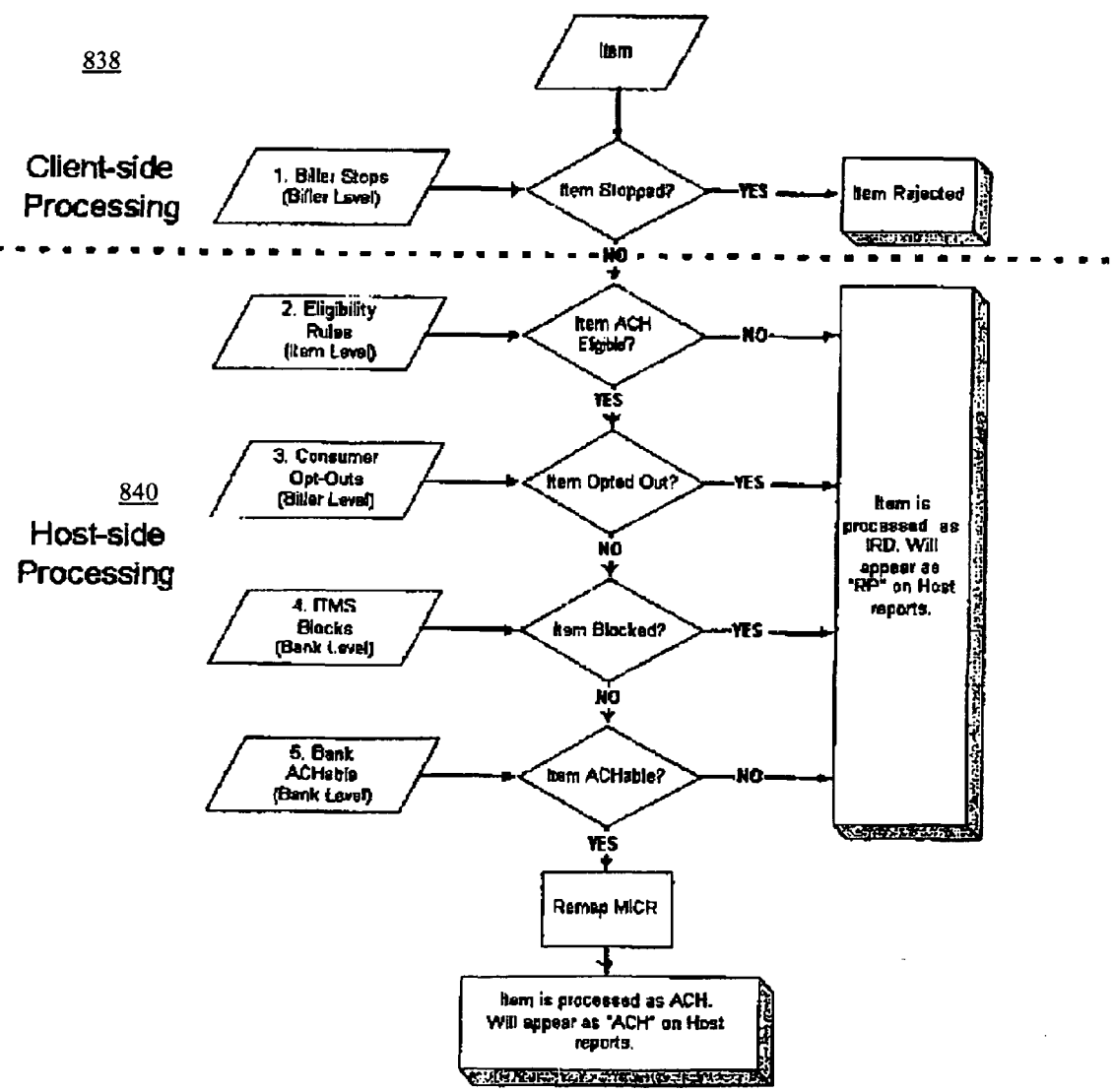
FIGS. 12*a,b,c* provide further embodiments of the processes of FIG. 11.
FIG. 12*d* shows a further embodiment of the decisioning process of FIG. 11 including an example of the distributed decisioning environment of FIG. 13.
Figure 12G:
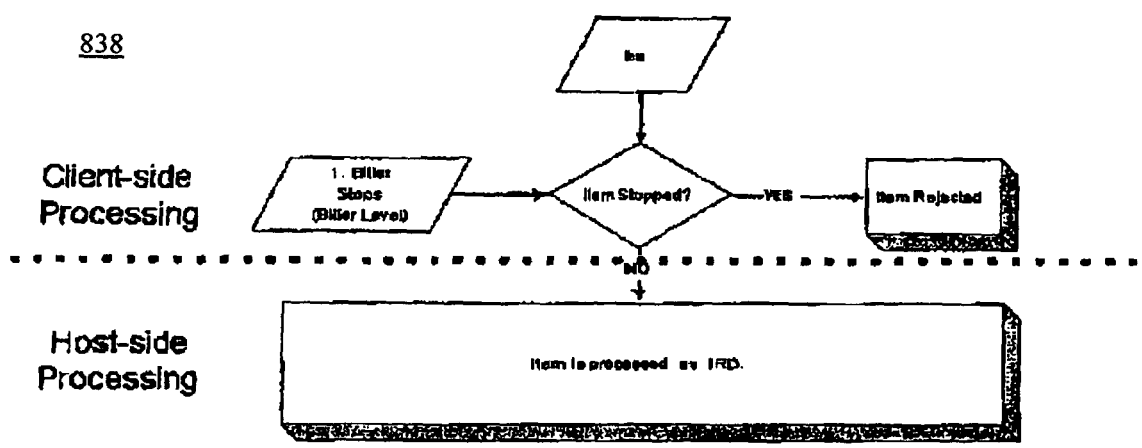

Referring to FIG. 12d, the following example table 830 summarizes example configurations 827 for the distributed decisioning environment 501 of FIG. 13. The table 830 indicates the decisioning filter types 822 as per the decisioning criteria 814, the processing location 830 as either the client 12 and/or the host 14, the expected settlement path 28, and example user messages 828 for presentation to the client system 12 (either directly if decision is local or via indirectly via the network 11 if the decision is on the host 12). In addition, the various workflows 832, 834, 836 of the configurations 827 are given by example in FIGS. 12e,f,g respectively, denoting possible client side processing 838 and host side processing 840 of the distributed decisioning environment 501.

Configuration Administration Tool 508

Figure 14:
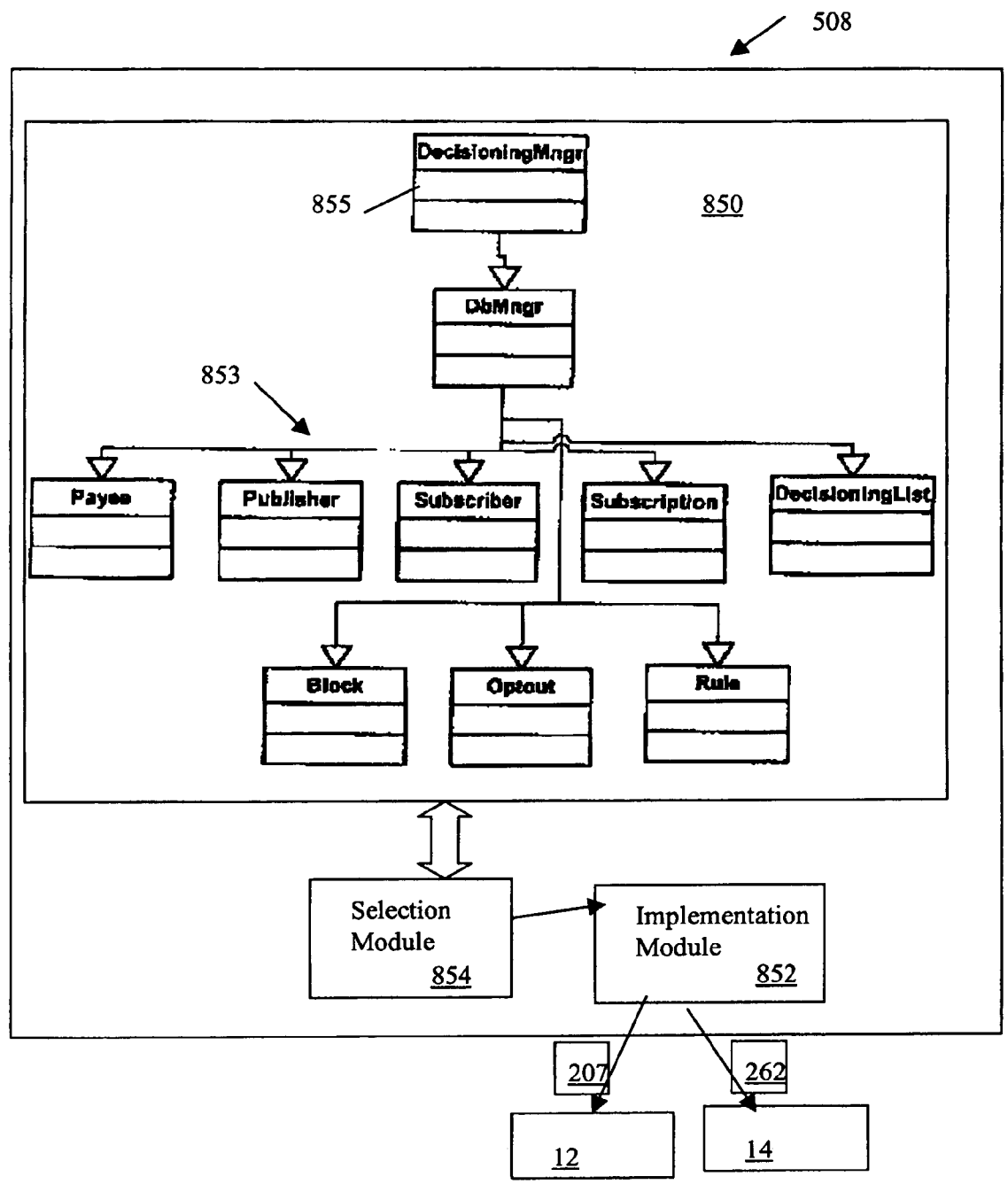
FIG. 14 is a block diagram of an administration configuration tool of FIG. 13.

Referring to FIG. 14, each time (or other specified period) the agent offices use one of the Client systems 12 to connect to the Host system 14. Upon start-up for example, the local decisioning filters 504 are updated by the configuration module 203 (e.g. via a deposit upload or as scheduled) with any changes that have been made for the distributed decisioning environment 501 by the Operator of the admin tool 508. The updates are provided as the configuration data packages 209 sent to the client system 12 over the network 11. It is recognised that similar packages 209 appropriate for the host system 14 can be sent over the network 11 in the case where the decisioning engine 24 is remote from the tool 508, otherwise the configuration data 262 can be stored in the database 22 for retrieval by the decisioning engine 24, as desired. It is recognised that the updating of the engine 24 by the configuration module 257 (see FIG. 1*c*) may take place synchronously or asynchronously with those updates performed at the client system 12, depending if the updates at the client system 12 impact operation of the filters 500 of the host system 14. The synchronous/asynchronous updating of the configuration data 207,262 is coordinated by an implementation module 852 of the tool 508. For example, the implementation module 852 can coordinate the Client 12 system downloads, or inherits (through the hierarchy 702—see FIG. 1*c*), the decisioning criteria 812 from the tool 508 and then depending on whether decisioning is set to occur at the Client 12 or Host 14, the image/data 20 Items/batches will be routed for processing accordingly by the decisioning process 812 and the settlement process 110.

Referring again to FIG. 14, the tool 508 also has a decision manager system 850 for determining the appropriate settings for the decision filter types 822 (see FIG. 12*d*), depending upon the configuration decided upon by the operator of the tool 508. The decision manager 855 of the system 850 manages all high level database interactions and internal decisioning management, where each of objects 853 are responsible for interaction with their associated database table 326 (see FIG. 5). The tool 508 also has a selection module 854 for preparing the configuration data 207,262 according to the settings determined by the decision manager system 850.

Referring again to FIGS. 12*d* and 14, the following steps can be performed by the decisioning manager system 850 to set-up the configuration data 207,262, such as but not limited to:

1. Configure the ACH Rules filter type 822 to decision the items as ineligible for ACH processing, e.g. a. Corporate checks (checks containing the Auxiliary OnUs fields) and b. Money orders (do not contain the check number field).

2. Configure the MICR Blocks filter type 822 to block specific identified numbers, e.g. bank RT and account number(s), from being processed as ACH items on a selected region of influence (e.g. on a corporate-wide basis);

3. Configure the Stops filter type 822 to stop specific identified numbers, e.g. policyholder remittance account number(s), or bank RT and account number(s), from being accepted for processing by the distributed decisioning system 501;

4. configure the opt-out filter type 822 to decision specific numbers, e.g. policy holder remittance account number(s), or bank RT and account number(s), from being processed as ACH items on a selected region of influence (e.g. on a corporate-wide basis); and 5. Configure at their parent node, for item decisioning to occur either at the Client 12 (locally), Host 14 level (centrally) or not at all. The System Operator can also select the appropriate processing endpoint (e.g. OPD or RP) for each decisioning filter type 822, along with an optional message to appear at the Client 12 each time an item were to match the decisioning criteria established at the host 14.

In view of the above, the system operator of the network system 10 configures the host/client system and associated engines 24,502 through the admin tool 508. The filters 500, 504 can be configured by the operator manually/semi-automatically/automatically via the tool 508, filters 500,504 such as but not limited to fiscal/type rules, biller stops, check writer ACH optouts, MICR line blocks and bank ACHables. It is recognised that application of the filters 500,504 by the engines 24,502 can provide for stream selection of the image/data 20 as the transactions 26 thus routed to the most appropriate settlement path 28 for processing such as ACH or IRD at the member 29 destination. The filters 504 and associated engine 502 of the client system 12 are downloaded (e.g. inherited) by the host system 14 according to the configuration of the engine 24, and engine 500, as to the separation of the decisioning criteria between host 14 and client 12 system. Further, ACHable transactions 26 can be further defined as either ARC (Accounts Receivable Check—person not present at time of image/data 20 capture) or POP (point of purchase check—person present at the time of image/data 20 capture).

Figure 15:
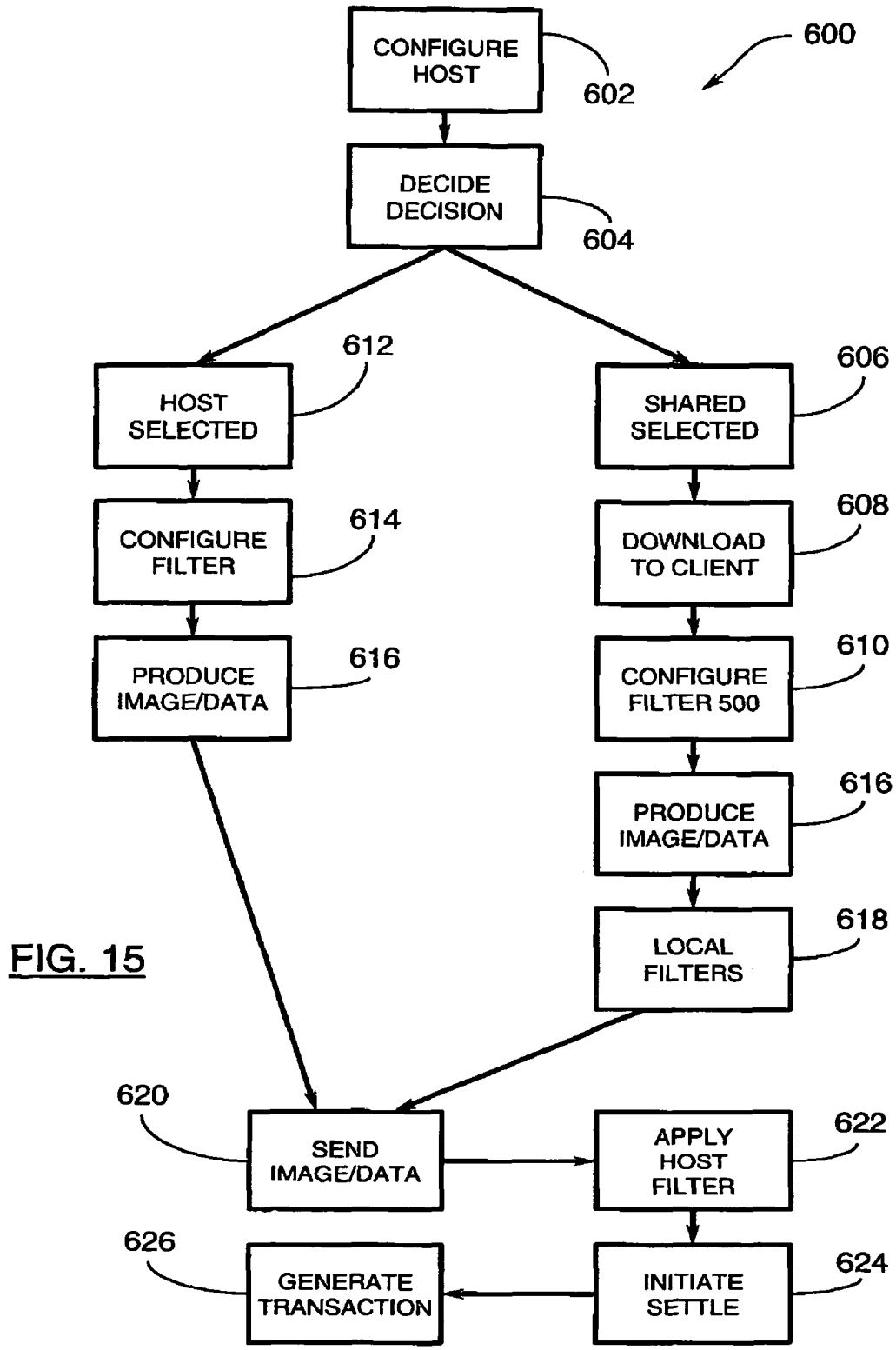
FIG. 15 provides an example operation of the administration configuration tool of FIG. 14.

Referring to FIG. 15, in a method 600, the operator of the configuration tool 508 configures 602 the host system 14 to have the decisioning rules of the filters 500. At step 604, the host system 12 (e.g. via the tool 508) is used to implement the degree of sharing of the decisioning/routing (i.e. filter 504 contents). At step 606 a shared decisioning/routing setup is selected and at step 608 the appropriate content for the filter 504, from the complete set of decisioning filter content provided by the decisioning criteria 812 (stored for example in the database 22), is downloaded to the client system 12. At step 610 the remaining portion of the decisioning filter content set (complimentary to that content of the filters 504) is transferred or otherwise configured as the filter 500. Otherwise at step 612 the host system is selected as the central decisioning/routing coordinator and the filter 500 is configured 614 to contain all of the necessary set of decisioning filter content.

At step 616 the image/data 20 is produced by the client system 12 in response to scanner operation and the decisioning filters 504 are applied 618 (if available) such that initial decisioning/routing is done for the image/data 20 before uploading to the host system 14. Otherwise, at step 620 the image/data 20 are sent directly to the host system for decisioning. At step 622, the host filters 500 are applied and either confirm the decision/route selected by the client system or override the decision/route according to the filters 500. At step 624, the settlement module 25 initiates the settlement process 110 at a predefined time (or other threshold) and the available decisioned/routed image/data 20 (resident in the database 22) is packaged as the transaction file(s) 26. At step 626 the decisioned/routed image/data 20 is sent as the transaction(s) 26 via the selected settlement paths 28 to the appropriate member 29 endpoint(s) for further processing (e.g. ACH).

It is recognised in the above embodiment of the tool 508 that the implementation module 852 can send to the systems 12,14 either the complete content of the filters 500,504 (or a portion thereof) including filter type settings, just changes to existing filter type settings of preinstalled filters 500,504, or a combination thereof.

Hierarchy Management Structure of Host-Client Network

Figure 16:
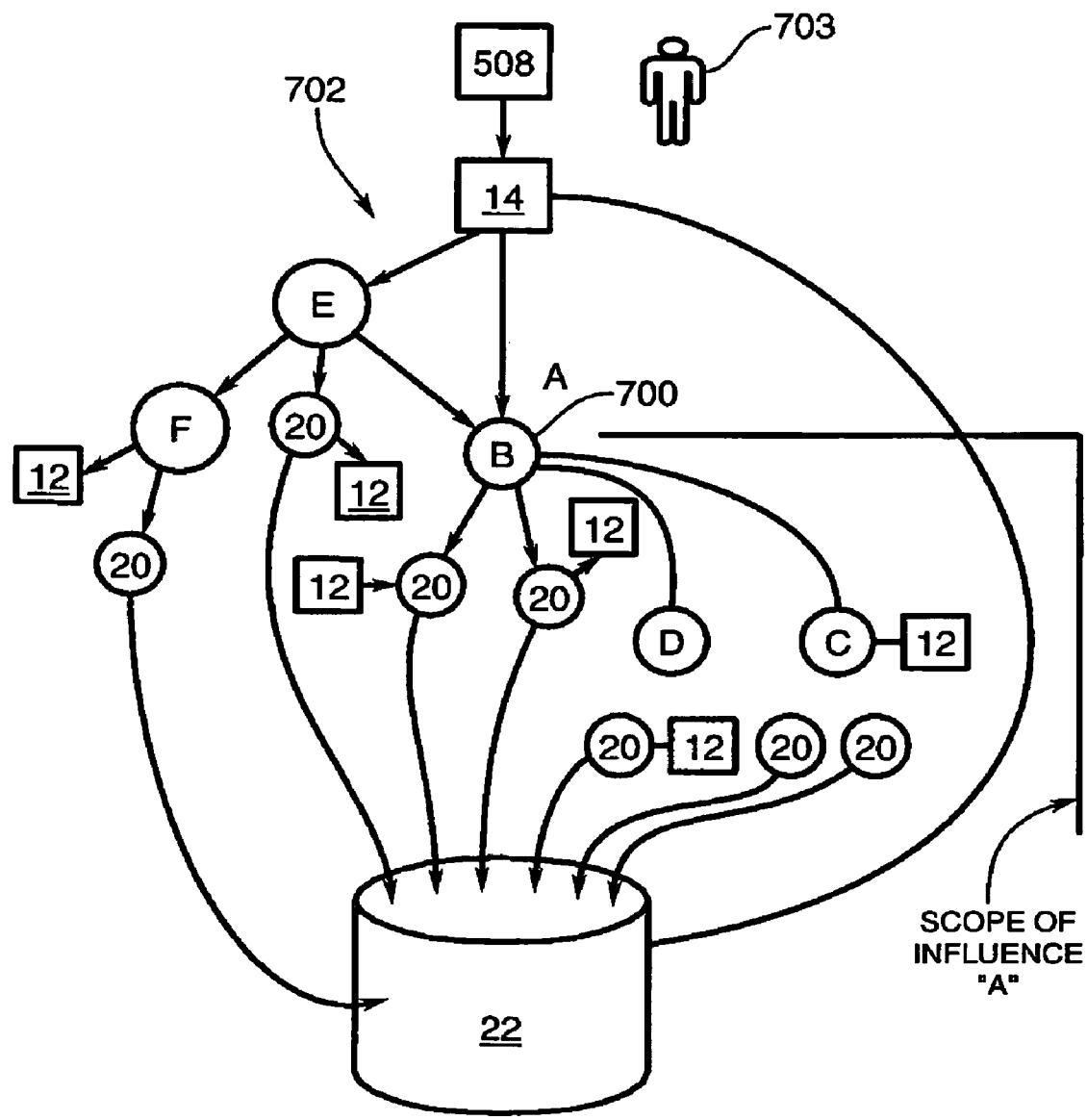
FIG. 16 shows a hierarchy of the system of FIG. 1.

Referring to FIG. 16, management of the network system 10 is structured such that there are a series of member nodes 700 (e.g. parent, child), organised in a hierarchy 702 (i.e. child node 700 inherits traits, data, rules of the parent node(s) 700), that are associated with respective client systems 12 as part of the overall network of image/data capture of documents 18. The actual image/data 20 that are associated with each of the nodes 700 is stored preferably centrally in the database 22 of the host system 14, and settlement information 720 of the settlement process 110 (e.g. including the decided settlement paths 28) is associated with each of the nodes 700 that originated the decisioned image/data 20, for example. The hierarchy 702 provides a hierarchical access control mechanism for the network system 10 that explicitly defines data access relationships and inheritance of information (e.g. attributed to decisioning). Further, use of the hierarchy 702 provides for configuration of the client systems 12 and the host system 14 for the decisioning process 814 (see FIG. 11), as well as provides coordination for the implementation of the settlement process 110 used to collect all decided settlement paths 28 associated with the decisioned image/data 20 of the database 22.

An operator or other system administrator(s) 703 can use the tool 508 to review or otherwise update/reconfigure particular node 700 functionality, content and local structure (including decisioning capabilities). For example, the tool 508 can be used facilitate all major administrative functions 856 (see FIG. 14) used for the day-to-day running of the network system 10 as well as the standard search facilities accessed through the web tools 32 (see FIG. 1) used by customers (e.g. client systems 12 and members 29) of the network system 10 to access items and images in the database 22. The administrative functions can include functions such as but not limited to management of the member hierarchy 318 (part of the hierarchy 702) and the associated users, roles, permissions, distribution settings and contact information, as well as search criteria input, results and image viewing, item results distribution, and the decisioning 814 and settlement 110 process configuration (see FIG. 11). The scope of influence of the operator 703 through the tool 508 depends upon the attachment point 874 (see FIG. 17) of the tool 508 to the member node hierarchy 702, e.g. through implementation via sign-on privileges that facilitates connection of the operator session of the tool 508 to the predefined node 700 of the hierarchy 702.

For example, referring again to FIG. 16, attachment point A of the tool 508 to the hierarchy 702 could allow the operator 703 to review or otherwise configure the "parent" node B and the associated "child" nodes C and D based on the administrative functions 856 available to that operator 703. It should be noted in the case of node D, the settlement data set 720 is resultant from the one coupled client system 12 (e.g. an insurance field agent operating out of an office—Node D), while the node C has two settlement data sets 720 coupled to one client system 12 (e.g. two field agents working out of one office—Node C). In this example, the Node B could be the Central office of the insurance company for Canada, while the node E could be the central office of the international insurance company. Therefore, the operator 703 through attachment point A could be able to review/configure features and functionality of the nodes B, C, D, while would be restricted from viewing or otherwise amending the features/functionality of Nodes E and F. It is recognised that the hierarchy 702 is structured as a flexible architecture whereby nodes 700 can be added, deleted, updated, reviewed, and reattached to other hierarchy 702 points by the operator 703, as provided for or otherwise permission(s) associated with the attachment point (e.g. A) of the tool 508.

Referring again to FIG. 16, configuration of the member nodes 700 of the hierarchy 702 can include such as but not limited to: manage member nodes 700, manage users of the nodes 700, permissions of the users/member nodes 700, configuration of settlement operation 110, configuration of the filter types 812 and associated rules/settings, and configure filters 500, 504 (e.g. installation of filter types 812 and their respective settings), deployment of software updates for updating/adding/removing features/functionality of the scanner 16, client system 12, and member nodes 700 administering the client systems 12. It is recognised that the host system 14 can be used to coordinate communication of the nodes 700 with one another as well as of the coupled client systems 12 through a member management module 27 (see FIG. 1), for example associate with at least the tool 508 used by the root 860 level node of the network system 10. The module 27 coordinates the application of the hierarchy 702 for all nodes 700 with associated client systems 12 connected to the particular host system 14 and it's associated database 22. It is recognised that the modules 27 can be located at each of the nodes 700 and interact with the module 27 (e.g. main module 27) for implementing the distributed decisioning environment 501 (see FIG. 13) as administered by a distributed configuration environment 858 (e.g. cooperation of connected modules 27 and associated tools 508—where some of the modules 27 may not be hosted by a particular tool 508, rather they would be hosted by the particular node 700, for example).

Figure 17:
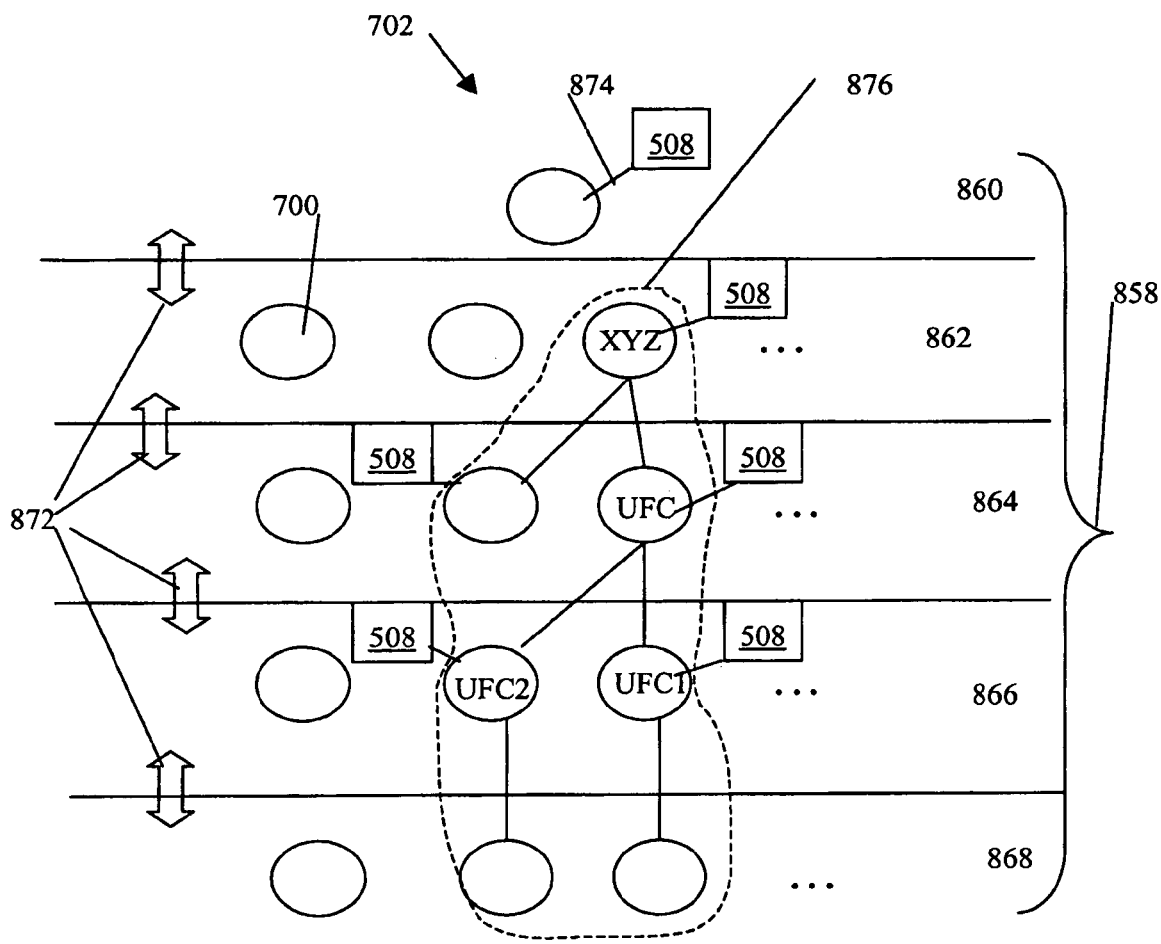
FIG. 17 a further embodiment of the hierarchy of FIG. 16.

Referring to FIGS. 16 and 17, it is recognised that use of multiple tools 508 (one or more as desired by the network system 10) by respective operators 703 (e.g. one tool 508 for every node 700 that is set up to generate configuration data 207, 262—see FIG. 14) results in the distributed configuration environment 858 for the plurality of nodes 700. These nodes 700 are structured into the hierarchy 702 using member types such as but not limited to: a root 860 level which is the very top node 700 of the hierarchy 702 and is generally the network system 10 administrator and provider of the network system 10; a customer 862 level having node(s) 700 who make contact with the root 860 level for access to the distributed decisioning environment 501 (see FIG. 13), e.g. a customer 862 level node 700 can be an acquirer; a merchant 864 level having node(s) 700 who own locations where the transactions 26 originate; a store 866 level having node(s) 700 which are the geographical (or Internet) location where the transactions 26 originate; a terminal 868 level having node(s) 700 which are the particular POS installations, e.g. the client system 12; and a group 870 level having node(s) 700 (optional—not shown) who are artificial members 29 used to provide a grouping for administration or reporting purposes. For example, the hierarchy 702 can enforce the member hierarchy 318 in the following example order; root 860 level, customer 862 level, merchant 864 level, store 866 level, and terminal 868 level, such that decisioning configuration data 207,262 (and other configuration data) is inherited from the parent node 700 by all dependent nodes 700 (e.g. the store 866 node inherits all configuration data 207,262 from the merchant 864 level node, who inherits all configuration data 207,262 from the customer 862 level node, etc. . . . Connections between the nodes 700 of the various levels 860,862, 864,866,868 is shown symbolically by reference numeral 872. An example set of administration functions 856 is given in Appendix A.

For example, referring again to FIG. 17, a specific member configuration 876 is shown in the hierarchy 702, where once the filters 500,504 (see FIG. 13) were configured at a UFC corporate node in the level 862, these filters 500,504 are automatically inherited downstream (as coordinated by the admin tool 508 and respective modules 27,852,854 where applicable) by each of the agent office "nodes" (e.g. UFC1, UFC2) in the hierarchy. For example, consider the UFC corporate node can be the "parent" and the UFC1, UFC2 agent nodes can be the "children", such that all children automatically inherit the filter 500,504 configurations and apply/store them. Further, for example the UFC node was not required to configure the ACHables filter of the filters 500,504, as this specific filter type was configured by a XYZ Financial Institution node to include all ACHable bank RT numbers for ACH processing, (or example, which was then automatically (or otherwise coordinated) inherited by UFC parent and UFC1, UFC2 child nodes. It is recognised that each of the nodes 700 of the hierarchy 702 would have a suitable configuration module (e.g. module 203 in the case of the client system 12—see FIG. 1*b*) for storing the configuration data 207,262 inherited (as well as that configuration data 207,262 generated by local tools 508), and for either using the configuration data 207,262 to configure the attached client system 12 or to further transmit the configuration data 207,262 further down the hierarchy to the dependent (e.g. child) nodes. It is recognized that all member 29 configurations (e.g. member configuration 876) may not have all levels 860,602,864,866,868, as desired by the respective members 29.

In general, one embodiment of the hierarchy 702 can operate using rules governing decisioning configuration as follows:

ACH is the prime method of settling check 18 items, unless the network system 10 is otherwise configured to route items for processing as either Original Paper Deposit or Reproduced Paper;

all decisioning information for a particular member node 700 also applies to it child members;

it may not be possible to stop decisioning information from applying to child member nodes 700;

child nodes 700 can have direct decisioning information (configured by the local admin tool 508) added to them and can utilize inherited decisioning information (configured by the remote admin tool 508) as well; and users may not be not allowed to override the decisioning information inherited at their member node 700 or respective child member node(s) 700.

Referring again to FIG. 16, ownership of the settlement data 720 (e.g. within the database 22) is associated with the node 700 of the hierarchy 702 to which the image/data 20 is assigned (e.g. generated by the respective client system 12). This ownership of settlement data 720 via the hierarchy 702 is used to facilitate the settlement process 110, as further described below.

Figure 18:
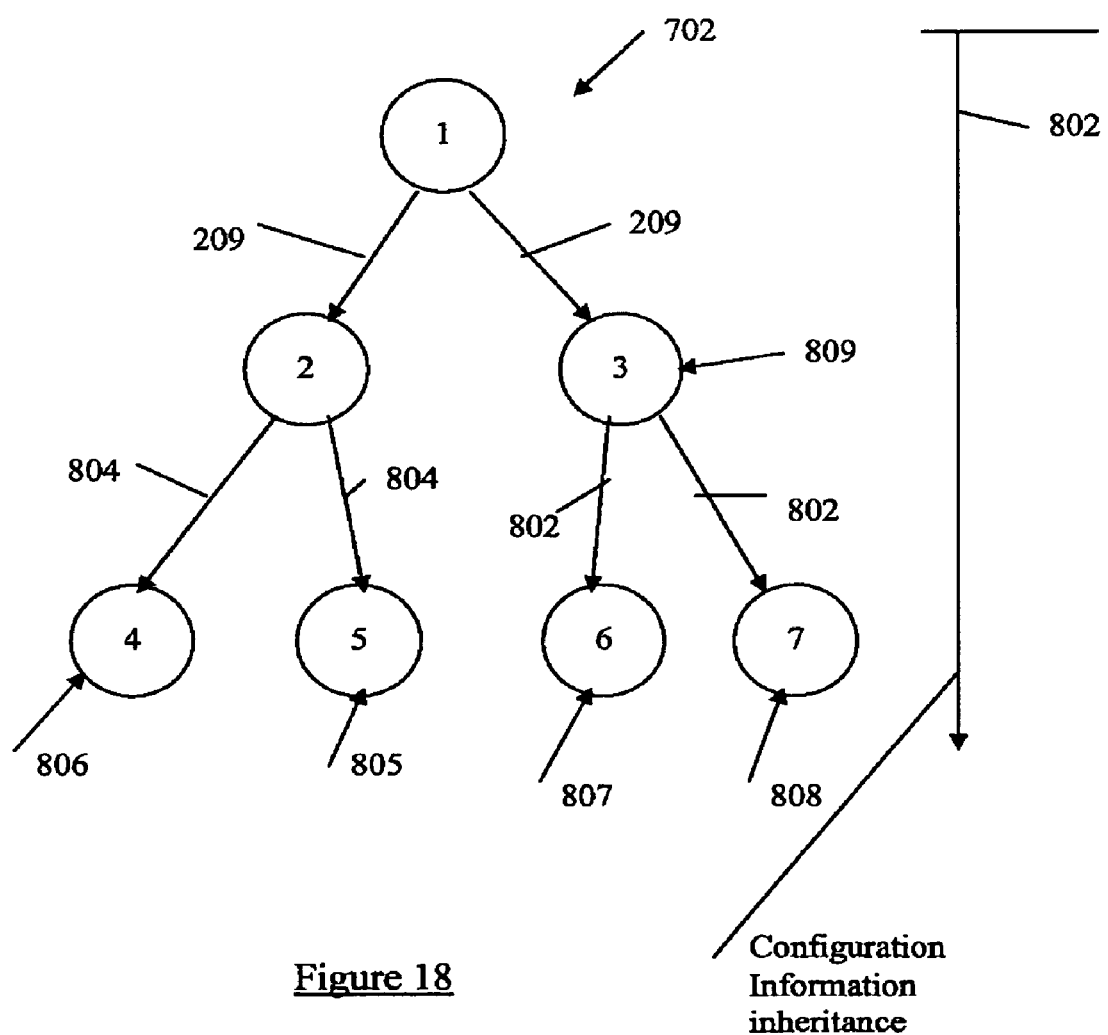
FIG. 18 is a schematic of a dissemination process of configuration data using a further embodiment of the hierarchy of FIG. 16.

Referring to FIG. 18, the hierarchy 702 is shown for use in: coordinating the management of the nodes and respective client systems 12 though inherited dissemination 800 of configuration information packages 209 (node features/functions, decisioning/routing criteria, filter location, software update, etc. . . . ) from the upper parent nodes down through the corresponding child node(s) and attached client systems 12. For example, according to inheritance rules, all selected configuration information packages 209 of node 1 would be distributed automatically to nodes 2,3 and associated nodes 4,5,6,7. However, any additional configuration information 802 (generated by the local tool 508—see FIG. 17) at node 3 would only be disseminated or otherwise influence nodes 6 and 7, while additional configuration information 804 at node 2 would only be disseminated or otherwise influence nodes 4 and 5, For example, node 1 would have configuration 209, node 2 would have configuration 209 and 804, node 3 would have configuration 209 and 802, nodes 4 and 5 would have configuration 209 and 804 plus any additional local configuration information 805, 806. Similarly nodes 6 and 7 would have configuration 209 and 802 and plus any additional local configuration information 807, 808. It should be noted that the configuration management of the nodes 1,2,3,4,5,6,7 by the respective modules 27 is assisted by the hierarchy 702 through inheritance of configuration information (i.e. the modules 27 have access to the hierarchy 702 so as to facilitate the dissemination 800—e.g. transmission over the network 11—of the respective configuration data). It is also recognised that inherited configuration information may not be overridden at the respective children nodes, as desired in set up of the network system 10.

Figure 19:
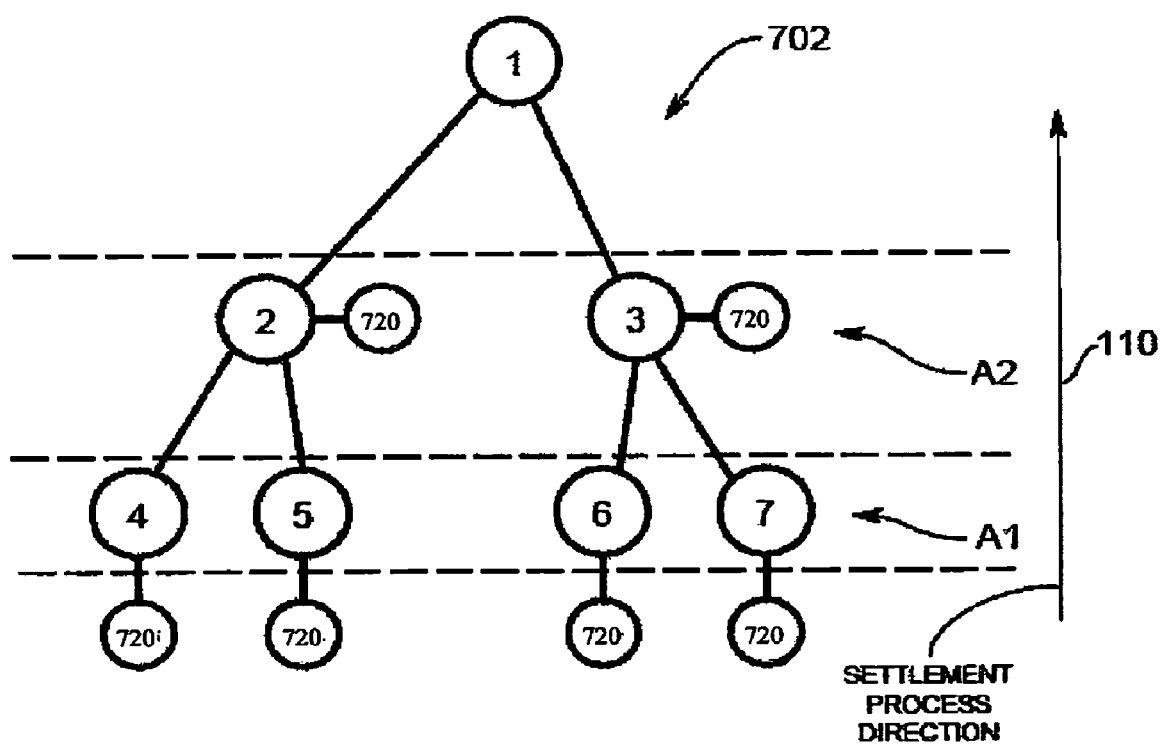
FIG. 19 shows a further embodiment of the settlement process of FIG. 7 using the hierarchy of FIG. 18.

Referring to FIG. 19, the settlement process 110 of the module 27 utilises the hierarchy 702 of the nodes 1,2,3,4,5,6 to gather the settlement data 720, starting from the bottom of the hierarchy 702. The settlement process 110 collects the settlement data 20 attributed to each of the lower children nodes (e.g. level A1). The process 110 then collects the settlement data 720 attributed to each of the adjacent parent nodes at level A2. Once the gathering of settlement data 720 is complete for all the nodes, the resultant transaction files 26 are generated and send by the host system 14 to the respective members 29 (those members 29 to which the individual decisioned image/data 20 is attributed to by respective IDs—see FIG. 1*d*).

In review of the above described hierarchy 702, it is recognised that the deployment of configuration information (e.g. dissemination process 800) to the nodes 700 is implemented from the top down in terms of inheritance, as well as locally generated configuration data depending upon the connection point 874 of the administration tool(s) 508 to the hierarchy 702. For example, there could be one tool 508 for administrating a group of nodes 700 where each node 700 and/or sub group of nodes 700 would also have their respective tools 508 and corresponding connection points 874 (in the case where those nodes 700 have permission to augment the inherited configuration data). On the contrary, the settlement process 110 is coordinated by use of the hierarchy 702 from the bottom up to gather settlement data 720 resident locally at the node 700 (logically through IDs—see FIG. 1*d*), as well as resident remotely in the central database 22 (physically), for example.

Example Settlement Process 110 Using the Hierarchy 702

Figure 20:
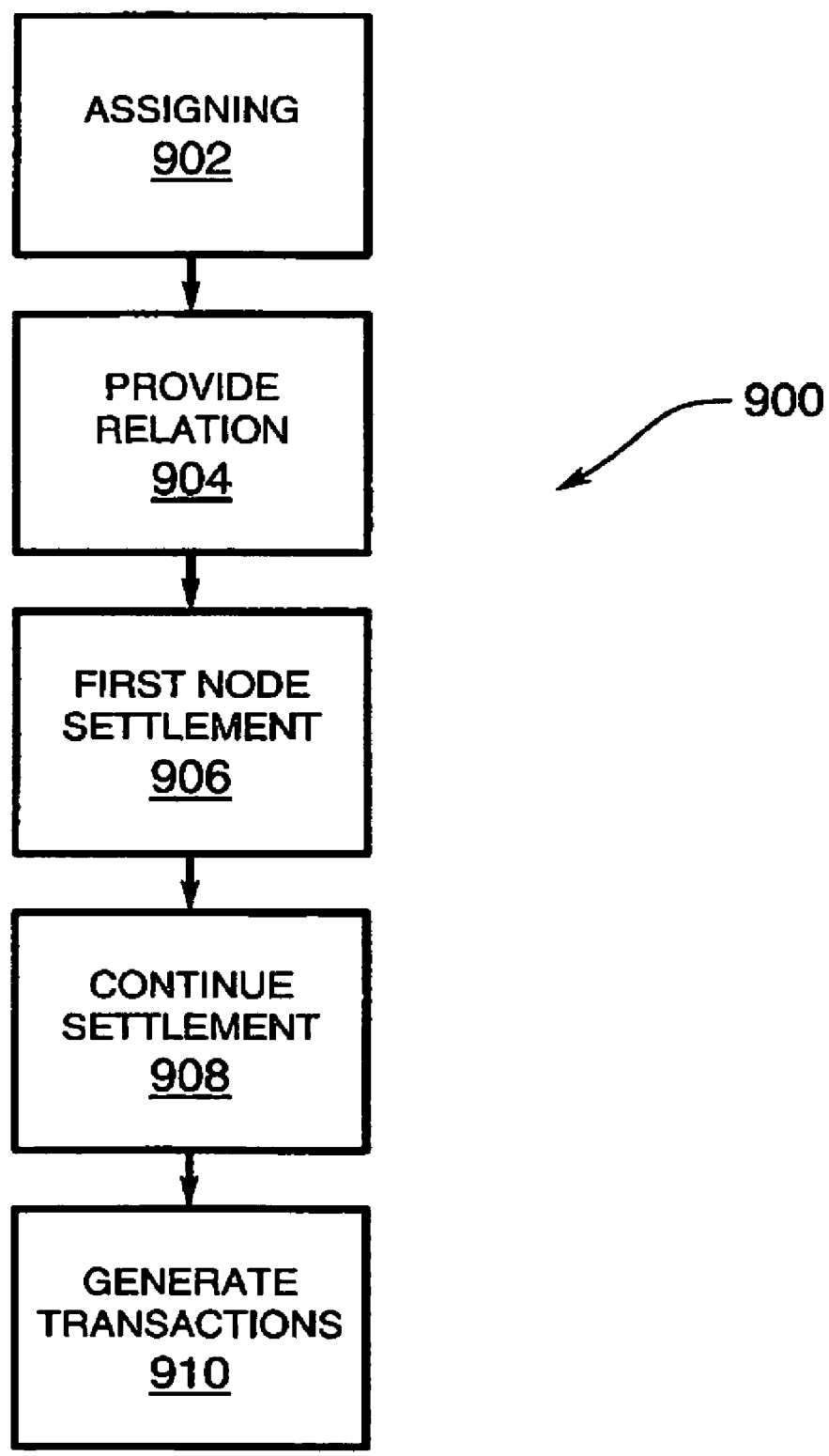
FIG. 20 is an example operation of a further embodiment of the settlement process shown in FIG. 19.

Referring to FIGS. 1, 16 and 20, an operation 900 for coordinating the generation of a plurality of transactions 26 from settlement data 720 associated with decisioned transaction data 20 (e.g. image/data 20) originally captured by at least one client system 12 is shown. The captured transaction data 20 is based on original paper 18 transactions and includes at least digital images of the respective original paper 18 transactions. The operation 900 includes steps such as but not limited to:

step 902—assigning respective portions of the settlement data 720 to a first node 700 and a second node 700;

step 904—providing a hierarchical relationship 702 between the first node 700 in a first hierarchy level (e.g. levels 860,602,864,866,868) and the second node 700 in a second hierarchy level (e.g. the level 860,602,864,866,868 dependent to the first level), the first node 700 related to the second node 700 as a dependent node;

step 906—initiating the settlement process 110 at the second node 700 for collecting all settlement data 720 assigned to the second node 720;

step 908—continuing the settlement process 110 at the first node 700 as defined by the hierarchical relationship 702 for collecting all settlement data 720 assigned to the first node 700; and step 910—generating the plurality of transactions 26 based on the collected settlement data 720 for sending to at least one member 29 system responsible for electronically processing the plurality of transactions 26.

I claim:

1. A method for coordinating the generation of a plurality of electronic transactions from settlement data associated with previously decisioned transaction data originally captured by distributed client computer systems, the method comprising the steps of:

providing a hierarchical access control mechanism for defining data access relationships and inheritance of information for a plurality of interconnected nodes, each of the plurality of nodes being associated with one or more client computer systems of the distributed client computer systems;

configuring the plurality of nodes by inheriting decisioning criteria using the hierarchical access control mechanism in a top down inheritance implementation, the inherited decisioning criteria for use by respective nodes of the plurality of nodes in decisioning respective node transaction data in generating respective node settlement data, such that the plurality of nodes includes a first node in a first hierarchy level, a second node in a second hierarchy level and a third node in a third hierarchy level, the second node related to the first node as a dependent node such that the second node is configured to inherit respective decisioning criteria from the first node, the third node related to the second node as a dependent node such that the third node is configured to inherit respective decisioning criteria from the second node thereby also inheriting respective decisioning criteria from the first node; and initiating a settlement process for the plurality of nodes using the data access relationship of the hierarchical access control mechanism in a bottom up implementation by:

collecting at the third node all third node settlement data assigned to the third node, the third node settlement data being associated with previously decisioned node transaction data of the third node based on the respective decisioning criteria inherited by the third node;

continuing the settlement process by collecting all second node settlement data assigned to the second node, the second node settlement data being associated with previously decisioned node transaction data of the second node based on the respective decisioning criteria inherited by the second node; and continuing the settlement process by collecting all the first node settlement data assigned to the first node, the first node settlement data being associated with previously decisioned node transaction data of the first node based on the respective decisioning criteria inherited by the first node; and generating the plurality of electronic transactions based on the collected settlement data including the first node settlement data, the second node settlement data and the third node settlement data and sending to at least one member system responsible for electronically processing the plurality of electronic transactions.

2. The method of claim 1 further comprising the step of generating the plurality of electronic transactions for a plurality of the member systems.

3. The method of claim 2, wherein the first hierarchy level includes a plurality of the first nodes, the second hierarchy level includes a plurality of the second nodes, and the third hierarchy level includes a plurality of the third nodes such that selected groups of the first nodes, the second nodes, and the third nodes are each related to a respective one of the plurality of member systems.

4. The method of claim 2, wherein the first hierarchical level is selected from the group comprising: a root level which represents a top node of the hierarchical relationship; a customer level which represents nodes who register for access to the settlement process; a merchant level which represents owners of locations where the plurality of transactions originate; a store level which represents the actual location where the transactions originate; a terminal level which represents the at least one client system; and a group level which represents artificial members used to provide a grouping for administration or reporting purposes.

5. The method of claim 4 further comprising the step of implementing the settlement process in the order defined by the data access relationship at the selected terminal level followed by the selected store level followed by the selected merchant level followed by the selected customer level and followed by the selected root level.

6. The method of claim 2, wherein the second hierarchical level is selected from a level dependent from the first hierarchical level from the group comprising: a customer level which represents nodes who register for access to the settlement process; a merchant level which represents owners of locations where the plurality of transactions originate; a store level which represents the actual location where the transactions originate; a terminal level which represents the at least one client system; and a group level which represents artificial members used to provide a grouping for administration or reporting purposes.

7. The method of claim 2 further comprising the step of generating the plurality of electronic transactions to account for said collected settlement data to include a settlement path selected from the group comprising: ACH for further electronic financial processing, Reproduce Paper for the captured transaction data not eligible for further electronic financial processing, Stop for the captured transaction data not accepted, original paper deposit for archiving only of the captured transaction data, and Remittance.

8. The method of claim 7 further comprising the step of generating the plurality of electronic transactions only after all of said collected settlement data is collected from the plurality of nodes.

9. The method of claim 2 further comprising the step of storing respective identities of the plurality of nodes in the first, second and third hierarchy levels in a central database, the hierarchical access control mechanism defining the respective identities.

10. The method of claim 9, wherein the previously decisioned transaction data, when eligible, is stored in the central database.

11. The method of claim 1, wherein the second node comprises direct decisioning transaction information configured locally at the second node in addition to the inherited decisioning criteria inherited from the first node to generate the settlement data at the second node.

12. The method of claim 11, wherein the third node comprises inherited decisioning transaction information from the second node comprising inherited decisioning criteria from the first node and direct decisioning transaction information generated locally at the second node.

13. The method of claim 12, wherein the third node further comprises direct decisioning information configured locally at the third node in addition to the inherited decisioning criteria to generate the settlement data assigned to the third node.

14. The method of claim 11, wherein the inherited decisioning criteria is not modifiable.

15. A computerized system for coordinating the generation of a plurality of electronic transactions from settlement data associated with previously decisioned transaction data originally captured by distributed client computer systems, the system configured to implement a set of stored instructions executable by a computer processor in generation of the plurality of electronic transactions, the system comprising:

at least one storage for storing a hierarchical access control mechanism for defining data access relationships and inheritance of information for a plurality of interconnected nodes, each of the plurality of nodes being associated with one or more client computer systems of the distributed client computer systems;

a configuration module for configuring the plurality of nodes by inheriting decisioning criteria using the hierarchical access control mechanism in a top down inheritance implementation, the inherited decisioning criteria for use by respective nodes of the plurality of nodes in decisioning respective node transaction data in generating respective node settlement data, such that the plurality of nodes includes a first node in a first hierarchy level, a second node in a second hierarchy level, and a third node in a third hierarchy level, the second node related to the first node as a dependent node such that the second node is configured to inherit respective decisioning criteria from the first node, the third node related to the second node as a dependent node such that the third node is configured to inherit respective decisioning criteria from the second node thereby also inheriting respective decisioning criteria from the first node; and a settlement module configured for initiating a settlement process for the plurality of nodes using the data access relationship of the hierarchical access control mechanism in a bottom up implementation by:

collecting at the third node all third node settlement data assigned to the third node, the third node settlement data being associated with previously decisioned node transaction data of the third node based on the respective decisioning criteria inherited by the third node;

continuing the settlement process by collecting all second node settlement data assigned to the second node, the second node settlement data being associated with previously decisioned node transaction data of the second node based on the respective decisioning criteria inherited by the second node; and continuing the settlement process by collecting all the first node settlement data assigned to the first node, the first node settlement data being associated with previously decisioned node transaction data of the first node based on the respective decisioning criteria inherited by the first node; and configuring the collected settlement data for use in generating the plurality of electronic transactions based on the collected settlement data including the first node settlement data, the second node settlement data and the third node settlement data and sending to at least one member system responsible for electronically processing the plurality of electronic transactions.

16. The computerized system of claim 15 further comprising a plurality of the member systems for the plurality of electronic transactions.

17. The computerized system of claim 16, wherein the first hierarchy level includes a plurality of the first nodes, the second hierarchy level includes a plurality of the second nodes, and the third hierarchy level includes a plurality of third nodes, such that selected groups of the first nodes, the second nodes and the third nodes are each related to a respective one of the plurality of member systems.

18. The computerized system of claim 16, wherein the first hierarchical level is selected from the group comprising: a root level which represents a top node of the hierarchical relationship; a customer level which represents nodes who register for access to the settlement process; a merchant level which represents owners of locations where the plurality of transactions originate; a store level which represents the actual location where the transactions originate; a terminal level which represents the at least one client system; and a group level which represents artificial members used to provide a grouping for administration or reporting purposes.

19. The computerized system of claim 18 further comprising the settlement module configured for implementing the settlement process in the order defined by the data access relationship at the selected terminal level followed by the selected store level followed by the selected merchant level followed by the selected customer level and followed by the selected root level.

20. The computerized system of claim 16, wherein the second hierarchical level is selected from a level dependent from the first hierarchical level from the group comprising: a customer level which represents nodes who register for access to the settlement process; a merchant level which represents owners of locations where the plurality of transactions originate; a store level which represents the actual location where the transactions originate; a terminal level which represents the at least one client system; and a group level which represents artificial members used to provide a grouping for administration or reporting purposes.

21. The computerized system of claim 16 further comprising the settlement module configured to account for the settlement data to include a settlement path selected from the group comprising: ACH for further electronic financial processing, Reproduce Paper for the captured transaction data not eligible for further electronic financial processing, Stop for the captured transaction data not accepted, original paper deposit for archiving only of the captured transaction data, and Remittance.

22. The computerized system of claim 21 further comprising the settlement module configured for generating the plurality of electronic transactions only after all of the said collected settlement data is collected from the plurality of nodes.

23. The computerized system of claim 16 further comprising a central database for storing respective identities of the plurality of nodes in the first, second and third hierarchy levels, the hierarchical access control mechanism defining the respective identities.

24. The computerized system of claim 23, wherein the previously decisioned transaction data, when eligible, is stored in the central database and the storage is represented as the central database.

* * * * *